(12) United States Patent
Shiokawa et al.

(10) Patent No.: US 10,539,766 B2
(45) Date of Patent: Jan. 21, 2020

(54) PROJECTION OPTICAL SYSTEM AND PROJECTION IMAGE DISPLAY DEVICE

(71) Applicant: SEIKO EPSON CORPORATION, Tokyo (JP)

(72) Inventors: Koji Shiokawa, Azumino (JP); Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 6 days.

(21) Appl. No.: 15/830,571

(22) Filed: Dec. 4, 2017

(65) Prior Publication Data

US 2018/0164554 A1 Jun. 14, 2018

(30) Foreign Application Priority Data

Dec. 9, 2016 (JP) ................ 2016-239108

(51) Int. Cl.
| | |
|---|---|
| *G02B 9/00* | (2006.01) |
| *G02B 13/00* | (2006.01) |
| *G02B 13/16* | (2006.01) |
| *G02B 17/00* | (2006.01) |
| *G02B 13/06* | (2006.01) |
| *G02B 9/64* | (2006.01) |
| *G03B 21/28* | (2006.01) |

(52) U.S. Cl.
CPC ............ *G02B 13/16* (2013.01); *G02B 13/06* (2013.01); *G02B 17/008* (2013.01); *G02B 9/64* (2013.01); *G03B 21/28* (2013.01)

(58) Field of Classification Search
CPC .... G02B 13/0095; G02B 13/04; G02B 13/06; G02B 13/16; G02B 17/008; G02B 17/08; G02B 17/0896; G02B 9/64; G03B 21/28; H04N 9/317; H04N 9/3197
See application file for complete search history.

(56) References Cited

U.S. PATENT DOCUMENTS

| | | | |
|---|---|---|---|
| 6,896,375 B2 | 5/2005 | Peterson et al. |
| 7,009,765 B2 | 3/2006 | Gohman |
| 7,090,354 B2 | 8/2006 | Engle et al. |
| 7,150,537 B2 | 12/2006 | Peterson et al. |
| 7,159,988 B2 | 1/2007 | Yatsu et al. |
| 7,175,287 B2 | 2/2007 | Gohman |

(Continued)

FOREIGN PATENT DOCUMENTS

| | | |
|---|---|---|
| JP | 2005-128286 A | 5/2005 |
| JP | 2005-157153 A | 6/2005 |

(Continued)

*Primary Examiner* — Thong Q Nguyen
(74) *Attorney, Agent, or Firm* — Oliff PLC

(57) ABSTRACT

A projection optical system includes a first lens unit adapted to make a enlargement-side imaging surface and an intermediate image conjugate with each other, a second lens unit adapted to make the intermediate image and a reduction-side imaging surface conjugate with each other. The first lens unit has positive power, and the second lens unit has negative power. Defining a focal distance of the first lens unit as fU1, a focal distance of the second lens unit as fU2, a total lens length of the first lens unit as LLU1, and a total lens length of the second lens unit as LLU2, the following expression (1) and expression (2) are satisfied:

$$-0.3 < fU1/fU2 < -0.005 \quad (1)$$

$$0.5 < LLU1/LLU2 < 0.9 \quad (2).$$

14 Claims, 21 Drawing Sheets

(56) References Cited

U.S. PATENT DOCUMENTS

| | | | |
|---|---|---|---|
| 7,227,682 B2 * | 6/2007 | Caldwell | G02B 7/008 |
| | | | 359/432 |
| 7,261,420 B2 | 8/2007 | Yatsu et al. | |
| 7,413,312 B2 | 8/2008 | Engle et al. | |
| 9,041,848 B2 | 5/2015 | Inoko | |
| 9,217,912 B2 | 12/2015 | Peterson et al. | |
| 9,261,767 B2 * | 2/2016 | Takano | G03B 21/28 |
| 9,429,826 B2 | 8/2016 | Peterson et al. | |
| 2004/0032570 A1 | 2/2004 | Peterson et al. | |
| 2004/0032653 A1 | 2/2004 | Gohman | |
| 2004/0223123 A1 | 11/2004 | Engle et al. | |
| 2004/0233394 A1 | 11/2004 | Gohman | |
| 2004/0257539 A1 | 12/2004 | Peterson et al. | |
| 2005/0088762 A1 * | 4/2005 | Ohashi | G02B 13/06 |
| | | | 359/754 |
| 2006/0028715 A1 * | 2/2006 | Kato | G02B 17/08 |
| | | | 359/365 |
| 2006/0227415 A1 * | 10/2006 | Caldwell | G02B 7/008 |
| | | | 359/432 |
| 2006/0290897 A1 | 12/2006 | Engle et al. | |
| 2007/0097327 A1 | 5/2007 | Yatsu et al. | |
| 2007/0146652 A1 | 6/2007 | Peterson et al. | |
| 2007/0253076 A1 | 11/2007 | Takaura et al. | |
| 2012/0300296 A1 | 11/2012 | Lin et al. | |
| 2014/0036142 A1 | 2/2014 | Inoko | |
| 2014/0204351 A1 | 7/2014 | Matsuo | |
| 2015/0042965 A1 | 2/2015 | Peterson et al. | |
| 2015/0234167 A1 | 8/2015 | Ode | |
| 2016/0070158 A1 | 3/2016 | Peterson et al. | |
| 2016/0246034 A1 | 8/2016 | Amano | |
| 2016/0246035 A1 | 8/2016 | Amano | |
| 2016/0246036 A1 | 8/2016 | Amano | |
| 2016/0246037 A1 | 8/2016 | Amano | |
| 2016/0246038 A1 | 8/2016 | Amano | |
| 2016/0256034 A1 | 9/2016 | Woolman et al. | |
| 2016/0256038 A1 | 9/2016 | Goldfarb et al. | |
| 2016/0341943 A1 | 11/2016 | Peterson et al. | |
| 2016/0342075 A1 | 11/2016 | Peterson et al. | |
| 2016/0363746 A1 | 12/2016 | Minefuji | |
| 2017/0343776 A1 | 11/2017 | Nagatoshi | |
| 2017/0343777 A1 | 11/2017 | Nagatoshi | |
| 2017/0343779 A1 * | 11/2017 | Nagahara | G02B 13/16 |
| 2017/0351070 A1 * | 12/2017 | Shiokawa | G02B 15/22 |
| 2018/0059389 A1 * | 3/2018 | Inoue | G02B 13/16 |
| 2018/0164554 A1 | 6/2018 | Shiokawa et al. | |
| 2018/0307015 A1 | 10/2018 | Amano | |
| 2018/0321475 A1 | 11/2018 | Amano | |
| 2018/0321476 A1 | 11/2018 | Amano | |
| 2019/0011683 A1 | 1/2019 | Amano | |

FOREIGN PATENT DOCUMENTS

| | | |
|---|---|---|
| JP | 2006-523318 A | 10/2006 |
| JP | 6266642 B2 | 8/2013 |
| JP | 2014-29392 A | 2/2014 |
| JP | 2015-152890 A | 8/2015 |
| JP | 2016-156183 A | 9/2016 |
| JP | 2016-156184 A | 9/2016 |
| JP | 2016-156185 A | 9/2016 |
| JP | 2016-156186 A | 9/2016 |
| JP | 2016-156982 A | 9/2016 |
| JP | 2016-156983 A | 9/2016 |
| JP | 2016-156984 A | 9/2016 |
| JP | 2016-156985 A | 9/2016 |
| JP | 2016-156986 A | 9/2016 |
| JP | 2017-211477 A | 11/2017 |
| JP | 2017-211478 A | 11/2017 |
| JP | 2017-211481 A | 11/2017 |

* cited by examiner

PROJECTION OPTICAL SYSTEM AND PROJECTION IMAGE DISPLAY DEVICE

BACKGROUND

1. Technical Field

The present invention relates to a projection optical system suitable to be incorporated in a projection image display device for projecting an image of an image display element in an enlarged manner, and the projection image display device equipped with the projection optical system.

2. Related Art

The optical system, which can be incorporated in a projection image display device such as a projector, is described in JP-A-2014-29392. When incorporated in projection image display device, the optical system in this document forms an intermediate image of the image of the image display element inside the optical system to reimage it on a screen. Specifically, the optical system of the document is provided with a first lens unit for making the screen (a enlargement-side imaging surface) and the intermediate image conjugate with each other, and a second lens unit for making the intermediate image and a reduction-side imaging surface (the image of the image display element) conjugate with each other.

In the projection optical system, it is required to enlarge the field angle so that the image of the image display element can be projected in an enlarged manner even in the case of disposing the projection image display device at a position close to the screen. However, if the field angle is enlarged, a distortion becomes apt to occur on the projection field projected on the screen. Regarding such a problem, it is possible to suppress the distortion of the projection field by increasing the number of lenses constituting the optical system. However, if the number of lenses increases, there arises a problem that the total length of the lenses increases.

SUMMARY

An advantage of some aspects of the invention is to provide a projection optical system capable of preventing the distortion from occurring on the projection field while putting a restraint on the total length of the lenses in the case of enlarging the field angle. Another advantage of some aspects of the invention is to provide a projection image display device incorporating such a projection optical system.

A projection optical system according to an aspect of the invention includes a first lens unit adapted to make enlargement-side imaging surface located on a enlargementside and an intermediate image conjugate with each other, and a second lens unit adapted to make the intermediate image and a reduction-side imaging surface located on a reductionside conjugate with each other, the first lens unit has positive power, the second lens unit has negative power, and defining a focal distance on a d-line of the first lens unit as $fU1$, a focal distance on a d-line of the second lens unit as $fU2$, a total lens length of the first lens unit as $LLU1$, and a total lens length of the second lens unit as $LLU2$, following conditional expression (1) and conditional expression (2) are satisfied.

$$-0.3 < fU1/fU2 < -0.005 \quad (1)$$

$$0.5 < LLU1/LLU2 < 0.9 \quad (2)$$

In the aspect of the invention, since the conditional expression (1) is satisfied, it is easy to prevent the distortion from occurring on the projection image surface while preventing the number of lenses from increasing to thereby enlarge the field angle. Further, in the aspect of the invention, since the conditional expression (2) is satisfied, it is possible to shorten the total lens length of the first lens unit to thereby prevent the total lens length of the entire projection optical system from increasing. Specifically, if the value of the conditional expression (1) exceeds the lower limit, the focal distance of the first lens unit becomes too long to enlarge the field angle. Further, if the value of the conditional expression (2) exceeds the lower limit, the tilt of the light beam between the second lens unit and the intermediate image with respect to the optical axis becomes large to incur the deterioration of the field curvature, and at the same time, the diameter of the lens located on the most intermediate image side of the second lens unit becomes large. In contrast, if the value of the conditional expression (1) exceeds the upper limit, the light beam entering the first lens unit from the intermediate image side becomes a roughly telecentric light beam or a light beam with the beam diameter increasing. Thus, the load on the first lens unit increases, and therefore, it is necessary to increase the number of lenses of the first lens unit in order to correct the aberration. Further, in the aspect of the invention, since the conditional expression (2) is satisfied, the total lens length of the first lens unit is shorter than the total lens length of the second lens unit, and it becomes easy to make the whole of the projection optical system compact.

In the aspect of the invention, it is preferable that the projection optical system further includes a first light path folding element and a second light path folding element adapted to fold a light path, the first light path folding element is disposed between the first lens unit and the second lens unit, and the second light path folding element is disposed inside the second lens unit. By adopting this configuration, there is no need to dispose a light path folding element inside the first lens unit in the case of disposing the light path folding elements in two places. Therefore, in the case of configuring the first lens unit using a plurality of lenses, it becomes easy to ensure the positional accuracy of each of the lenses of the first lens unit compared to the case in which the light path folding element is disposed inside the first lens unit. Further, since the light path folding element is not disposed inside the first lens unit, there is no need to provide a space for disposing the light path folding element inside the first lens unit, and it is possible to prevent the total lens length of the first lens unit from increasing.

In the aspect of the invention, it is preferable that a principal beam of an off-axis light beam passing between a second lens unit intermediate image-side first lens closest to the intermediate image of the second lens unit and a first lens unit intermediate image-side lens closest to the intermediate image of the first lens unit comes closer to an optical axis as proceeding from the second lens unit intermediate image-side first lens toward the first lens unit intermediate image-side lens. By adopting this configuration, it is easy for the second lens unit to correct the distortion aberration occurring in the first lens unit, and it is possible to suppress the burden of correcting the aberration by the first lens unit.

In the aspect of the invention, it is preferable that a focusing position of the off-axis light in the intermediate image comes closer to the second lens unit intermediate image-side first lens as proceeding toward an off-axis direction. By adopting this configuration, it is easier for the second lens unit to correct the distortion aberration occurring in the first lens unit.

In the aspect of the invention, it is preferable that a first lens unit enlargement-side lens located on a most enlargement-side imaging surface side of the first lens unit, and the first lens unit intermediate image-side lens located on a most intermediate image side of the first lens unit are each an aspherical lens. By adopting this configuration, it becomes easy to appropriately correct the distortion aberration in the first lens unit enlargement-side lens. Further, by using the aspherical lens as the first lens unit enlargement-side lens, it is easy to reduce the diameter of the first lens unit enlargement-side lens. Further, in the case of providing the configuration in which the principal beam of the off-axis light beam passing between the second lens unit intermediate image-side first lens and the first lens unit intermediate image-side lens comes closer to the optical axis as proceeding from the second lens unit intermediate image-side first lens toward the first lens unit intermediate image-side lens, by using the aspherical lens as the first lens unit intermediate image-side lens, it is easy to reduce the diameter of the first lens unit intermediate image-side lens.

In the aspect of the invention, it is preferable that the first lens unit is provided with, in the order from the side of the enlargement-side imaging surface toward the side of the intermediate image, a first lens unit enlargement-side lens, a first lens group provided with two or more lenses each having negative power, and a second lens group provided with at least one lens having positive power, and in a case of changing a projection size on the enlargement-side imaging surface, focusing is performed by moving two or more lens groups including the first lens group and the second lens group in an optical axis direction in a state of fixing the first lens unit enlargement-side lens. By adopting this configuration, it is possible to achieve focusing while preventing the aberration from occurring when the projection size has been changed.

In the aspect of the invention, it is preferable that the second lens unit is provided with, in the order from the side of the enlargement-side imaging surface toward the side of the intermediate image, a second lens unit intermediate image-side first lens, which is provided with a concave surface on the intermediate image side and has positive power, a second lens unit intermediate image-side second lens, which is provided with a concave surface on the reduction-side imaging surface side and is provided with negative power, and a second lens unit intermediate image-side third lens having positive power, the second lens unit intermediate image-side first lens, the second lens unit intermediate image-side second lens, and the second lens unit intermediate image-side third lens are located between the first light path folding element and the second light path folding element, and defining a refractive index on a d-line of the second lens unit intermediate image-side first lens as nd (21), and an Abbe number as vd (21), a refractive index on a d-line of the second lens unit intermediate image-side second lens as nd (22), and an Abbe number as vd (22), following, conditional expression (3) and conditional expression (4) are satisfied.

$$|nd(22)-nd(21)|<0.4 \qquad (3)$$

$$|vd(21)-vd(22)|<30 \qquad (4)$$

By adopting this configuration, the aberration, which occurs at a position high in image height on the side closer to the intermediate image than the second light path folding element in the second lens unit, can be made appropriate. Thus, it becomes easy for the first lens unit to correct the aberration occurring in the second lens unit.

In the aspect of the invention, it is preferable that a second lens unit reduction-side first lens located on a most reduction-side imaging surface side of the second lens unit and a second lens unit reduction-side second lens located adjacent to the second lens unit reduction-side first lens are each provided with positive power, and the second lens unit reduction-side first lens is higher than 1.75 and lower than 2.00 in refractive index on the d-line, and larger than 20 and smaller than 45 in Abbe number. By adopting this configuration, it becomes easy to correct the field curvature and the chromatic aberration.

In the aspect of the invention, it is preferable that defining a focal distance on an overall d-line as f, and an air-conversion value of an overall back focus as BF, a following conditional expression (5) is satisfied.

$$BF/|f|>5 \qquad (5)$$

By adopting this configuration, a relatively long back focus can be ensured, and it becomes easy to make the optical system wide angle.

A projection image display device according to another aspect of the invention includes the projection optical system described above, and an image display element adapted to display an image on the reduction-side imaging surface.

According to the aspect of the invention, it is possible to prevent the distortion from occurring on the projection image surface while preventing the total lens length from increasing in the case of increasing the field angle in the projection optical system. Therefore, it is possible to make the projection image display device equipped with the projection optical system compact.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
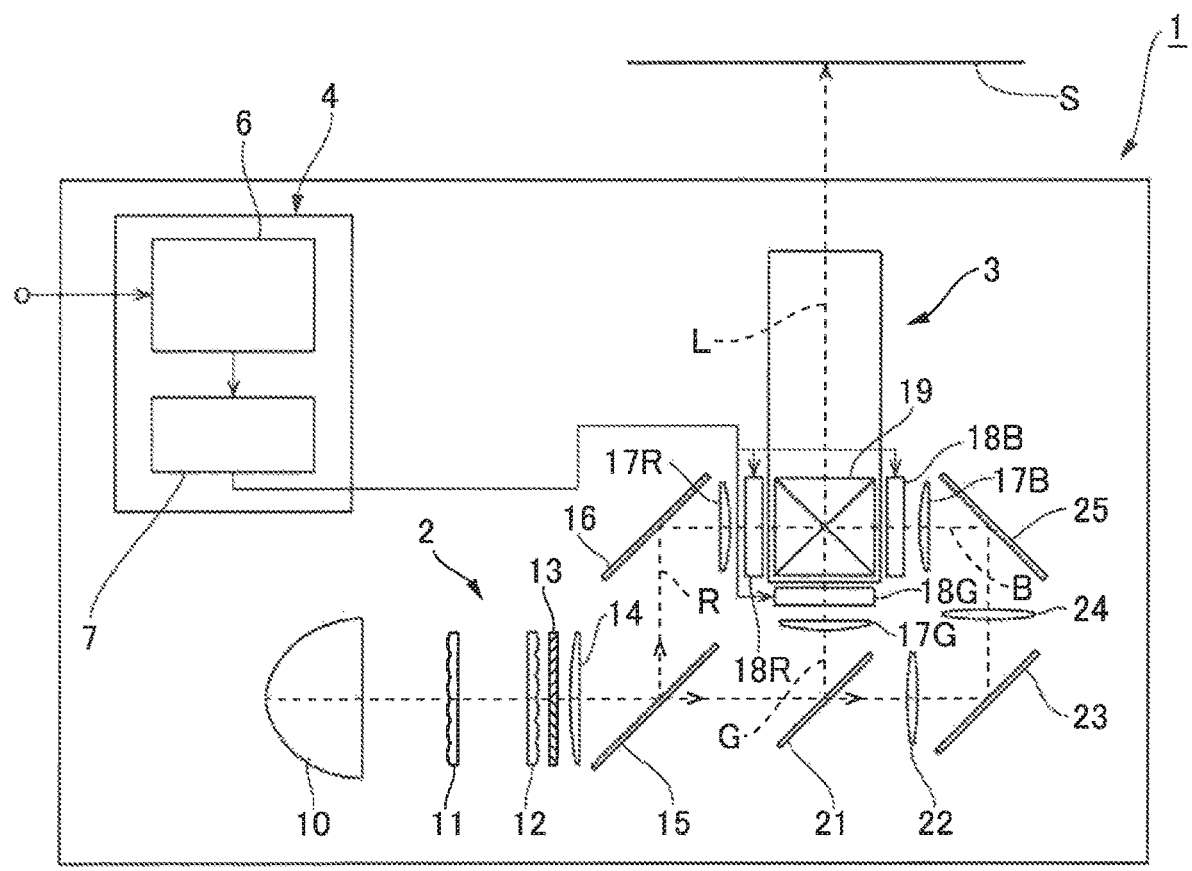
FIG. 1 is a diagram showing a schematic configuration of a projection image display device equipped with a projection optical system according to the invention.

A projection optical system according to the embodiment of the invention and a projection image display device equipped with the projection optical system will hereinafter be described in detail with reference to the accompanying drawings.
Projection Image Display Device FIG. 1 is a schematic configuration diagram of a projector equipped with a projection optical system according to the embodiment. As shown in FIG. 1, the projector (projection image display device) 1 is provided with an image light generation optical system 2 for generating image light to be projected on a screen S, a projection optical system 3 for projecting the image light in an enlarged manner, and a control section 4 for controlling an operation of the image light generation optical system 2.
Image Light Generation Optical System and Control Section The image light generation optical system 2 is provided with a light source 10, a first integrator lens 11, a second integrator lens 12, a polarization conversion element 13, and an overlapping lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The overlapping lens 14 overlaps the images of the respective lens elements of the first integrator lens 11 on the display area of each of a liquid crystal panel 18R, a liquid crystal 18G, and a liquid crystal 18B described later via the second integrator lens 12.

Further, the image light generation optical system 2 is provided with a first dichroic mirror 15, a reflecting mirror 16 and a field lens 17R, and a liquid crystal panel 18R. The first dichroic mirror 15 reflects R light as a part of the light beam having entered the first dichroic mirror 15 from the overlapping lens 14, and transmits G light and B light which are parts of the light beam having entered the first dichroic mirror 15 from the overlapping lens 14. The R light having been reflected by the first dichroic mirror 15 enters the liquid crystal panel 18R via be reflecting mirror 16 and the field lens 17R. The liquid crystal panel 18R is an image display element. The liquid crystal panel 18R modulates the R light in accordance with an image signal to thereby form a red image.

Further, the image light generation optical system 2 is provided with a second dichroic mirror 21, a field lens 17G, and a liquid crystal panel 18G. The second dichroic mirror 21 reflects the G light as a part of the light beam from the first dichroic mirror 15, and transmits the B light as a part of the light beam from the first dichroic mirror 15. The G light having been reflected by the second dichroic mirror 21 enters the liquid crystal panel 18G via the field lens 17G. The liquid crystal panel 18G is the image display element. The liquid crystal panel 18G modulates the G light in accordance with the image signal to thereby form a green image.

Further, the image light generation optical system 2 is provided with a relay lens 22, a reflecting mirror 23, a relay lens 24, a reflecting mirror 25 and a field lens 17B, and a liquid crystal panel 18G. The B light having been transmitted through the second dichroic mirror 21 enters the liquid crystal panel 18B via the relay lens 22, the reflecting mirrors 23, the relay lens 24, the reflecting mirror 25, and the field lens 17B. The liquid crystal panel 18B is the image display element. The liquid crystal panel 18B modulates the B light in accordance with the image signal to thereby form a blue image.

The liquid crystal panel 18R, the liquid crystal panel 18G, and the liquid crystal panel 18B surround the cross dichroic prism 19 from three directions. The cross dichroic prism 19 is a light combining prism, and combines the light modulated by the respective liquid crystal panels 18R, 18G, and 18B with each other to generate the image light.

Here, the cross dichroic prism 19 constitutes a part of the projection optical system 3. The projection optical system 3 projects the image light (the image formed by the liquid crystal panels 18R, 18G, and 18B) combined by the cross dichroic prism 19 on the screen S in an enlarged manner.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signal output from the image processing section 6.

The image processing section 6 converts the image signal input from external equipment into the image signals including the tones and so on of the respective colors. The display drive section 7 operates the liquid crystal panel 18R, the liquid crystal panel 18G and the liquid crystal panel 18B based on the image signals of the respective colors output from the image processing section 6. Thus, the image processing section 6 displays the image corresponding to the image signals on the liquid crystal panel 18R, the liquid crystal panel 18G and the liquid crystal panel 18B.

Projection Optical System

Then, the projection optical system 3 will be described. Examples 1 through 4 will hereinafter be described as configuration examples of the projection optical system 3 implemented in the projector 1.

EXAMPLE 1

Figure 2:
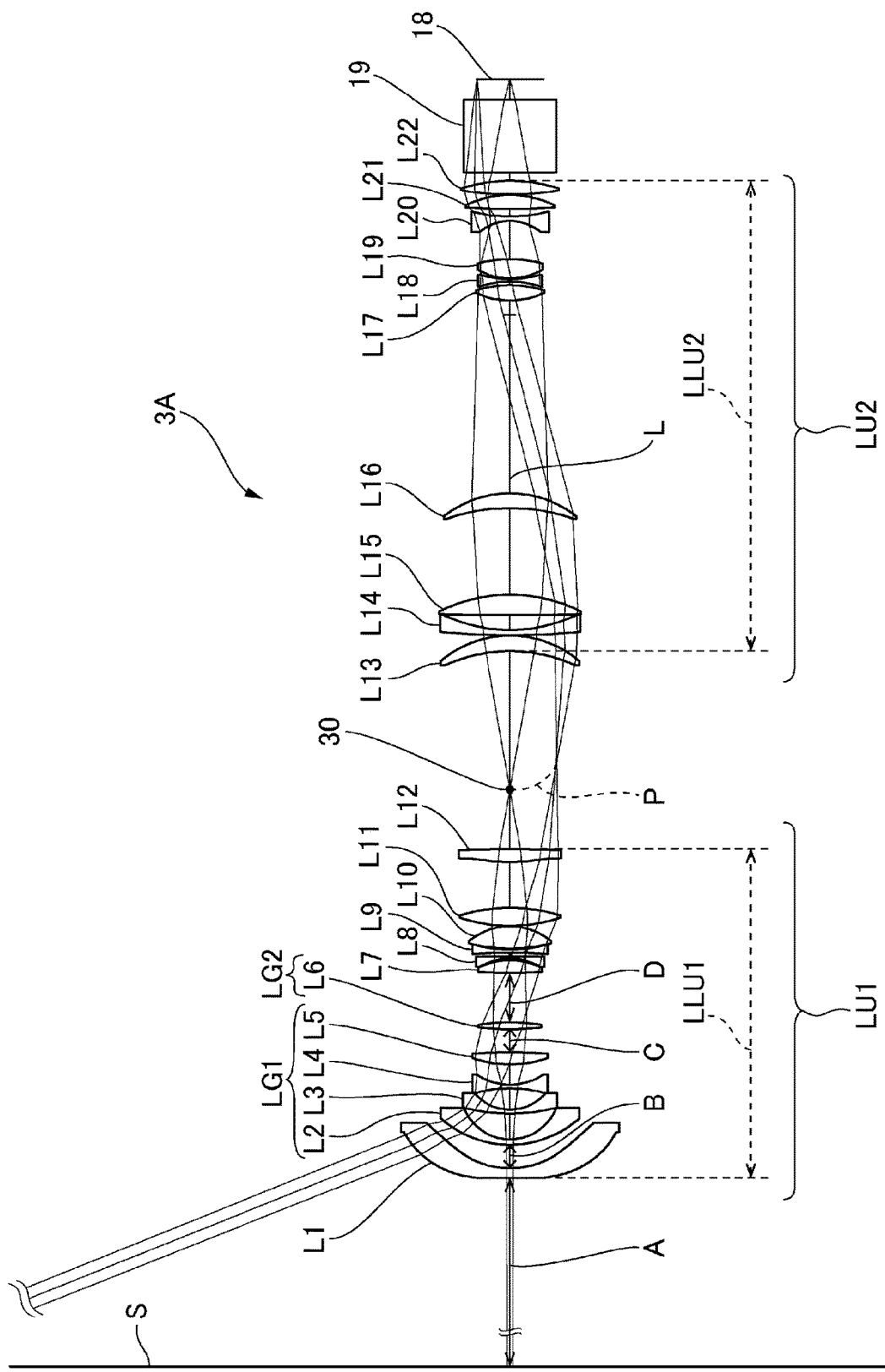
FIG. 2 is a configuration diagram of the projection optical system of Example 1.

FIG. 2 is a configuration diagram (ray chart) of the projection optical system of Example 1. As shown in FIG. 2, the projection optical system 3A of the present example is formed of a first lens unit LU1 for making the screen S as the enlargement-side imaging surface and an intermediate image 30 conjugate with each other, and a second lens unit LU2 for making the intermediate image 30 and the liquid crystal panel 18 (18R, 18G, and 18B) as the reduction-aide imaging surface conjugate with each other. The first lens unit LU1 has positive power. The second lens unit LU2 has negative power.

The first lens unit LU1 is provided with a first lens unit first lens L1 (a first lens unit enlargement-side lens) provided with negative power, a first lens group LG1 provided with negative power, and a second lens group LG2 provided with positive power from the screen S side toward the intermediate image 30.

The first lens unit first lens L1 is an aspherical lens provided with aspherical shapes on the both surfaces.

The first lens group LG1 is provided with two or more lenses each having negative power. In the present example, the first lens group LG1 is formed of four lenses, namely a first lens unit second lens L2, a first lens unit third lens L3, a first lens unit fourth lens L4, and a first lens unit fifth lens L5 from the screen S side toward the intermediate image 30. The first lens unit second lens L2 and the first lens unit third lens L3 are each provided with negative power, and at the same time are each provided with a convex meniscus shape on the screen S side. The first lens unit fourth lens L4 is provided with negative power, and at the same time is provided with concave surfaces on the screen S side and the intermediate image 30 side, respectively. The first lens unit fifth lens L5 is provided with positive power, and is provided with convex surfaces on the screen S side and the intermediate image 30 side, respectively.

The second lens group LG2 is formed of a single lens. The first lens unit sixth lens L6 constituting the second lens group LG2 is provided with positive power. Further, the first lens unit sixth lens L6 is provided with convex surfaces on the screen S side and the intermediate image 30 side, respectively.

Further, the first lens unit LU1 is provided with a first lens unit seventh lens L7, a first lens unit eighth lens L8, a first lens unit ninth lens L9, a first lens unit tenth lens L10, a first lens unit eleventh lens L11, and a first lens unit twelfth lens L12 from the second lens group LG2 toward the intermediate image 30. Therefore, the first lens unit LU1 is formed of the 12 lenses. In the present example, the first lens unit twelfth lens L12 (a first lens unit intermediate image-side lens) is an aspherical lens provided with aspherical shapes on the both surfaces The second lens unit LU2 is provided with a second lens unit first lens L13, a second lens unit second lens L14, a second lens unit third lens L15, a second lens unit fourth lens L16, a second lens unit fifth lens L17, a second lens unit sixth lens L18, a second lens unit seventh lens L19, a second lens unit eighth lens L20, a second lens unit ninth lens L21, and a second lens unit tenth lens L22 from the intermediate image 30 side toward the liquid crystal panel 18. Therefore, the second lens unit LU2 is formed of the 10 lenses. Between the second lens unit fourth lens L16 and the second lens unit fifth lens L17, there is disposed a stop. Between the second lens unit tenth lens L22 and the liquid crystal panel 18, there is disposed the cross dichroic prism 19.

The second lens unit first lens L13 (a second lens unit intermediate image-side first lens) has positive power. The second lens unit first lens L13 has a meniscus shape provided with a concave surface on the intermediate image 30 side, and a convex surface on the liquid crystal panel 18 side. The second lens unit second lens L14 (a second lens unit intermediate image-side second lens) has negative power. The second lens unit second lens L14 has a meniscus shape provided with a convex surface on the intermediate image 30 side, and a concave surface on the liquid crystal panel 18 side. The second lens unit third lens L15 (a second lens unit intermediate image-side third lens) has positive power. The second lens unit third lens L15 is provided with convex surfaces on the intermediate image 30 side, and the liquid crystal panel 18 side, respectively. The second lens unit fourth lens L16 has negative power. The second lens unit fourth lens L16 has a meniscus shape provided with a concave surface on the intermediate image 30 side, and a convex surface on the liquid crystal panel 18 side.

The second lens unit tenth lens L22 (a second lens unit reduction-side first lens) the closest to the liquid crystal panel 18 in the second lens unit LU2, and the second lens unit ninth lens L21 (a second lens unit reduction-side second lens) located adjacent to the second lens unit tenth lens L22 are each provided with positive power. Further, the second lens unit ninth lens L21 and the second lens unit tenth lens L22 are each provided with convex surfaces on the intermediate image 30 side, and the liquid crystal panel 18 side, respectively.

In the projection optical system 3A, as shown in FIG. 2, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12. The focusing position P of the off-axis light in the intermediate image 30 comes closer to the second lens unit first lens L13 as proceeding toward the off-axis direction.

In the case of changing the projection size on the screen S in the projection optical system 3A, the first lens group LG1 and the second lens group LG2 (the first lens unit sixth lens L6) are moved in the optical axis L direction to achieve focusing in the state of fixing the first lens unit first lens L1.

Here, defining the focal distance of the projection optical system 3A as |f|, the maximum field angle (half field angle) as ω, the F-number as FNo, an effective image circle diameter as φ, an air-conversion value of the back focus as BF, the total lens length of the first lens unit LU1 as LLU1, and the total lens length of the second lens unit LU2 as LLU2, the data of the projection optical system 3A of Example 1 is as follows. It should be noted that the total lens length LLU1 is the distance from the surface on the screen S side of the first lens unit first lens L1 to the surface on the intermediate image 30 side of the first lens unit twelfth lens L12 on the optical axis L. The total lens length LLU2 is the distance from the surface on the intermediate image 30 side of the second lens unit first lens L13 to the surface on the liquid crystal panel 18 side of the second lens unit tenth lens L22 on the optical axis L.

|f|=8.1 mm
ω=68.4°
FNo=1.92
φ=41.2 mm
BF=47.33 mm
LLU1=201.988 mm
LLU2=289.277 mm

Further, the lens data of the projection optical system 3A is as follows. The column of the lens shows the reference symbols attached to the respective lenses shown in FIG. 2. The surfaces having the surface number attached with "*" are spherical surfaces. The reference symbol R represents a curvature radius. The reference symbol d represents an on-axis surface distance (mm) (lens thickness or a lens distance). The reference symbol nd represents a refractive index. The reference symbol vd represents an Abbe number. It should be noted that the on-axis surface distance A is the distance between the screen S and the first lens unit first lens L1. The on-axis surface distance B is the distance between the first lens unit first lens L1 and the first lens group LG1. The on-axis surface distance C is the distance between the first lens group LG1 and the second lens group LG2 (the first lens unit sixth lens L6). The on-axis surface distance D is the distance between the second lens group LG2 (the first lens unit sixth lens L6) and the first lens unit seventh lens L7. The on-axis surface distance A varies with the projection size, and the on-axis surface distances B, C, and D change due to focusing in the case in which the projection size has been changed.

| LENS | SURFACE NUMBER | R | d | nd | vd |
|---|---|---|---|---|---|
| S | | INFINITY | A | | |
| L1 | *1 | −127.155 | 6 | 1.50942 | 55.88 |
| | *2 | 93.46 | B | | |
| L2 | 3 | 65.7 | 3.31 | 1.8515 | 40.78 |
| | 4 | 31.35 | 15.81 | | |
| L3 | 5 | 120.2 | 2.4 | 1.8515 | 40.78 |
| | 6 | 29.25 | 13.183 | | |
| L4 | 7 | −82.2 | 2.2 | 1.497 | 81.54 |
| | 8 | 38.6 | 12.72 | | |
| L5 | 9 | 71.85 | 7.47 | 1.84666 | 23.78 |
| | 10 | −284.4 | C | | |
| L6 | 11 | 175.4 | 4.27 | 1.8061 | 33.27 |
| | 12 | −118 | D | | |
| L7 | 13 | 329 | 7.78 | 1.62299 | 58.16 |
| | 14 | −45.95 | 0.854 | | |
| L8 | 15 | −39.95 | 1.6 | 1.84666 | 23.78 |
| | 16 | −2012 | 2.417 | | |
| L9 | 17 | −209.4 | 1.8 | 1.84666 | 23.78 |
| | 18 | 91.4 | 0.574 | | |
| L10 | 19 | 109.7 | 13.65 | 1.437 | 95.1 |
| | 20 | −40.95 | 0.3 | | |
| L11 | 21 | 102 | 11.13 | 1.58913 | 61.14 |
| | 22 | −102 | 27.953 | | |
| L12 | *23 | 124.839 | 8 | 1.693 | 53.21 |
| | *24 | −242.024 | 121.71 | | |
| L13 | 25 | −100.25 | 9.64 | 1.51633 | 64.14 |
| | 26 | −67.25 | 0.2 | | |
| L14 | 27 | 453 | 3.2 | 1.72342 | 37.95 |
| | 28 | 97.45 | 9.19 | | |
| L15 | 29 | 1752 | 12.45 | 1.8061 | 33.27 |
| | 30 | −100.3 | 53.518 | | |
| L16 | 31 | −122.75 | 9.1 | 1.48749 | 70.23 |
| | 32 | −67.4 | 109.583 | | |
| (STOP) | 33 | INFINITY | 9 | | |
| L17 | 34 | 50.1 | 9.4 | 1.497 | 81.54 |
| | 35 | −71.45 | 2.22 | | |
| L18 | 36 | −60.8 | 1.6 | 1.84666 | 23.78 |
| | 37 | 75.3 | 0.2 | | |
| L19 | 38 | 40.4 | 11.75 | 1.497 | 81.54 |
| | 39 | −86.55 | 23.576 | | |
| L20 | 40 | −30.75 | 2.8 | 1.72047 | 34.71 |
| | 41 | 97.35 | 4.57 | | |
| L21 | 42 | 401 | 8.77 | 1.92206 | 20.88 |
| | 43 | −61.25 | 0.23 | | |
| L22 | 44 | 199.8 | 8.28 | 1.92206 | 20.88 |
| | 45 | −101.75 | 5 | | |
| (19) | 46 | INFINITY | 45 | 1.51633 | 64.14 |
| | 47 | INFINITY | 12.662 | | |

The coefficients of the odd-order aspheric expression for defining the aspherical shape of each of the surfaces (of the first lens unit first lens L1) with the surface numbers 1, 2 formed as the aspherical surfaces are as follows.

| | SURFACE NUMBER | |
|---|---|---|
| | 1 | 2 |
| Y CURVATURE RADIUS | −127.155 | 93.460 |
| CONIC CONSTANT | −78.162 | 0.9484 |
| 3rd-ORDER ASPHERIC COEFFICIENT | 1.38880E−04 | 1.73280E−04 |
| 4th-ORDER ASPHERIC COEFFICIENT | 1.31437E−06 | 4.30293E−07 |
| 5th-ORDER ASPHERIC COEFFICIENT | −7.61410E−08 | −3.49749E−08 |
| 6th-ORDER ASPHERIC COEFFICIENT | 6.25270E−10 | −4.11747E−10 |
| 7th-ORDER ASPHERIC COEFFICIENT | 1.00030E−11 | −2.95924E−13 |
| 8th-ORDER ASPHERIC COEFFICIENT | −1.18610E−13 | −1.80842E−14 |
| 9th-ORDER ASPHERIC COEFFICIENT | −5.52320E−16 | 2.85569E−15 |
| 10th-ORDER ASPHERIC COEFFICIENT | 3.66450E−18 | −2.21878E−17 |
| 11th-ORDER ASPHERIC COEFFICIENT | 3.49550E−20 | 5.99749E−19 |
| 12th-ORDER ASPHERIC COEFFICIENT | −5.02200E−22 | −1.42705E−20 |
| 13th-ORDER ASPHERIC COEFFICIENT | 2.49180E−23 | −1.59931E−22 |
| 14th-ORDER ASPHERIC COEFFICIENT | 2.89970E−25 | 3.16009E−24 |
| 15th-ORDER ASPHERIC COEFFICIENT | −5.99340E−27 | 1.21786E−25 |
| 16th-ORDER ASPHERIC COEFFICIENT | −8.17120E−30 | −9.09008E−28 |
| 17th-ORDER ASPHERIC COEFFICIENT | −8.54110E−31 | −2.50937E−29 |
| 18th-ORDER ASPHERIC COEFFICIENT | 1.45660E−32 | −2.53188E−31 |
| 19th-ORDER ASPHERIC COEFFICIENT | | 6.90450E−33 |

Further, the coefficients of the even-order aspheric expression for defining the aspherical shape of each of the surfaces (of the first lens unit twelfth lens L12) with the surface numbers 23, 24 formed as the aspherical surfaces are as follows.

|  | SURFACE NUMBER | |
| --- | --- | --- |
|  | 23 | 24 |
| Y CURVATURE RADIUS | 124.839 | −242.024 |
| CONIC CONSTANT (K) | 7.680 | −30.433 |
| 4th-ORDER COEFFICIENT (A) | 3.03157E−06 | 8.09122E−06 |
| 6th-ORDER COEFFICIENT (B) | −8.42818E−09 | −1.14279E−08 |
| 8th-ORDER COEFFICIENT (C) | 6.52659E−13 | 4.78197E−13 |
| 10th-ORDER COEFFICIENT (D) | 4.45705E−16 | 4.52965E−15 |
| 12th-ORDER COEFFICIENT (E) | 7.52640E−19 | −4.25747E−19 |
| 14th-ORDER COEFFICIENT (F) | 5.77205E−22 | −4.59442E−22 |
| 16th-ORDER COEFFICIENT (G) | 6.42776E−25 | −1.68605E−25 |
| 18th-ORDER COEFFICIENT (H) | 1.13418E−27 | 6.05709E−28 |
| 20th-ORDER COEFFICIENT (J) | −1.31584E−30 | 0.00000E+00 |

Then, the on-axis surface distances A, B, C, and D (unit: mm), the focal distance |f| (unit: mm), and the half field angle ω (unit: °) in the case of changing the projection size and then performing focusing are as follows. It should be noted that a set of the positions of the lenses after achieving focusing in the case of setting the on-axis surface distance A, which is the distance between the first lens unit first lens and the screen S, to 1050 mm is defined as Position 1, a set of the positions of the lenses in the case of setting the on-axis surface distance A to 720 mm is defined as Position 2, and a set of the positions of the lenses in the case of setting the on-axis surface distance A to 2500 mm is defined as Position 3.

|  | POSITION 1 | POSITION 2 | POSITION 3 |
| --- | --- | --- | --- |
| A | 1050 | 720 | 2500 |
| B | 14.161 | 14.335 | 13.893 |
| C | 14.168 | 14.333 | 13.931 |
| D | 30.238 | 29.899 | 30.743 |
| |f| | 8.1 | 8.08 | 8.13 |
| ω | 68.4 | 68.3 | 68.4 |

According to the projection optical system 3A of the present example, since the second lens unit first lens L13 has positive power, it is easy to form the intermediate image 30 on the first lens unit LU1 side of the second lens unit first lens L13. Further, since the intermediate image 30 is formed using the lens having positive power, it is easy for the second lens unit LU2 to correct the distortion aberration occurring in the first lens unit LU1.

Further, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12, and the focusing position P of the off-axis light in the intermediate image 30 comes closer to the second lens unit first lens L13 as proceeding toward the off-axis direction. Thus, it is easy for the second lens unit LU2 to correct the distortion aberration occurring in the first lens unit LU1, and it is possible to suppress the burden of correcting the aberration by the first lens unit LU1.

Further, in the present example, since the first lens unit first lens L1 and the first lens unit twelfth lens L12 are the aspherical lenses, it is easy to correct the distortion aberration in the first lens unit first lens L1, and it becomes easy to correct the field curvature in the first lens unit twelfth lens L12. Further, since the first lens unit first lens L1 is the aspherical lens, it is easy to reduce the diameter of the first lens unit first lens L1.

Here, the projection optical system 3A satisfies the following conditional expression (1) defining the focal distance of the first lens unit LU1 as fU1, and the focal distance of the second lens unit LU2 as fU2.

$$-0.3 < fU1/fU2 < -0.005 \quad (1)$$

Specifically,
fU1=11.94
fU2=−1046.50
and, therefore,
fU1/fU2=−0.011
is obtained.

Since the projection optical system 3A of the present example satisfies the conditional expression (1), it is easy to prevent the distortion from occurring in the projection field while preventing the number of lenses from increasing to thereby make the maximum field angle as wide angle as no smaller than 120° (make the half field angle ω no smaller than) 60°). That is, if the value of the conditional expression (1) exceeds the lower limit, the focal distance of the first lens unit LU1 becomes too long to easily make the field angle wide angle. Further, if the value of the conditional expression (1) exceeds the lower limit, the tilt of the light beam between the second lens unit LU2 and the intermediate image 30 with respect to the optical axis L becomes large to incur the deterioration of the field curvature, and at the same time, the diameter of the lens (the second lens unit first lens L13) located on the most intermediate image 30 side of the second lens unit LU2 becomes large. In contrast, if the value of the conditional expression (1) exceeds the upper limit, the light beam entering the first lens unit LU1 from the intermediate image 30 side becomes a roughly telecentric light beam or a light beam with the beam diameter increasing. Thus, the load on the first lens unit LU1 increases, and therefore, it is necessary to increase the number of lenses of the first lens unit LU1 in order to correct the aberration.

Further, in the present example, the total lens length LLU1 of the first lens unit LU1 and the total lens length LLU2 of the second lens unit LU2 satisfy the following conditional expression (2).

$$0.5 < LLU1/LLU2 < 0.9 \quad (2)$$

Specifically,
LLU1/LLU2=201.988/289.277=0.70
is obtained.

Therefore, according to the present example, it is easy to make the total lens length LLU1 of the first lens unit LU1 shorter than the total lens length LLU2 of the second lens unit LU2, and thus make the whole of the projection optical system 3A compact.

Further, in the present example, the second lens unit first lens L13 is provided with positive power, the second lens unit second lens L14 is provided with negative power, and the second lens unit third lens L15 is provided with positive power. Further, the second lens unit first lens L13 is provided with a concave surface on the intermediate image 30 side, and the second lens unit second lens L14 is provided with the concave surface on the liquid crystal panel 18 side. In addition thereto, defining the refractive index on the d-line of the second lens unit first lens L13 as nd (21), and the Abbe number as vd (21), the refractive index on the d-line of the second lens unit second lens L14 as nd (22), and the Abbe number as vd (22), the following conditional expression (3) and conditional expression (4) are satisfied.

$$|nd(22)-nd(21)|<0.4 \qquad (3)$$

$$|vd(21)-vd(22)|<30 \qquad (4)$$

Specifically,
|nd(22)−nd(21)|=|1.72342−1.51633|=0.21
and,
|vd(21)−vd(22)|=64.14−37.95=26.19
are obtained.

Since the second lens unit first lens L13, the second lens unit second lens L14, and the second lens unit third lens L15 are provided with the configuration described above, and satisfy the conditional expression (3) and the conditional expression (4), it is possible for the projection optical system 3A to make the aberration occurring at a position high in image height in the second lens unit LU2 appropriate. Thus, it becomes easy for the first lens unit LU1 to correct the aberration occurring in the second lens unit LU2.

Further, in the present example, defining the focal distance on the d-line as f, and the air-conversion value of the overall back focus as BF, the following conditional expression (5) is satisfied.

$$BF/|f|>5 \qquad (5)$$

Specifically,
BF/|f|=47.33/8.1=5.8
is obtained.

Since the conditional expression (5) is satisfied, in the projection optical system 3A, a relatively long back focus can be ensured, and it is easy to make the maximum field angle as wide angle as no smaller than 120°.

Further, in the present example, the second lens unit tenth lens L22 located on the most liquid crystal panel 18 side of the second lens unit LU2, and the second lens unit ninth lens L21 located adjacent to the second lens unit tenth lens L22 are each provided with positive power. Further, defining the refractive index on the d-line of the second lens unit tenth lens L22 as nd (23), and the Abbe number thereof as vd (23), the following conditional expression (6) and conditional expression (7) are satisfied.

$$1.75<nd(23)<2.00 \qquad (6)$$

$$20<vd(23)<45 \qquad (7)$$

Specifically,
nd(23)=1.92206
vd(23)=20.88
are set.

Since the second lens unit ninth lens L21 and the second lens unit tenth lens L22 are each provided with positive power, and at the same time satisfy the conditional expression (6) and the conditional expression (7), in the projection optical system 3A, it is easy to correct the field curvature and the chromatic aberration.

Figure 3:
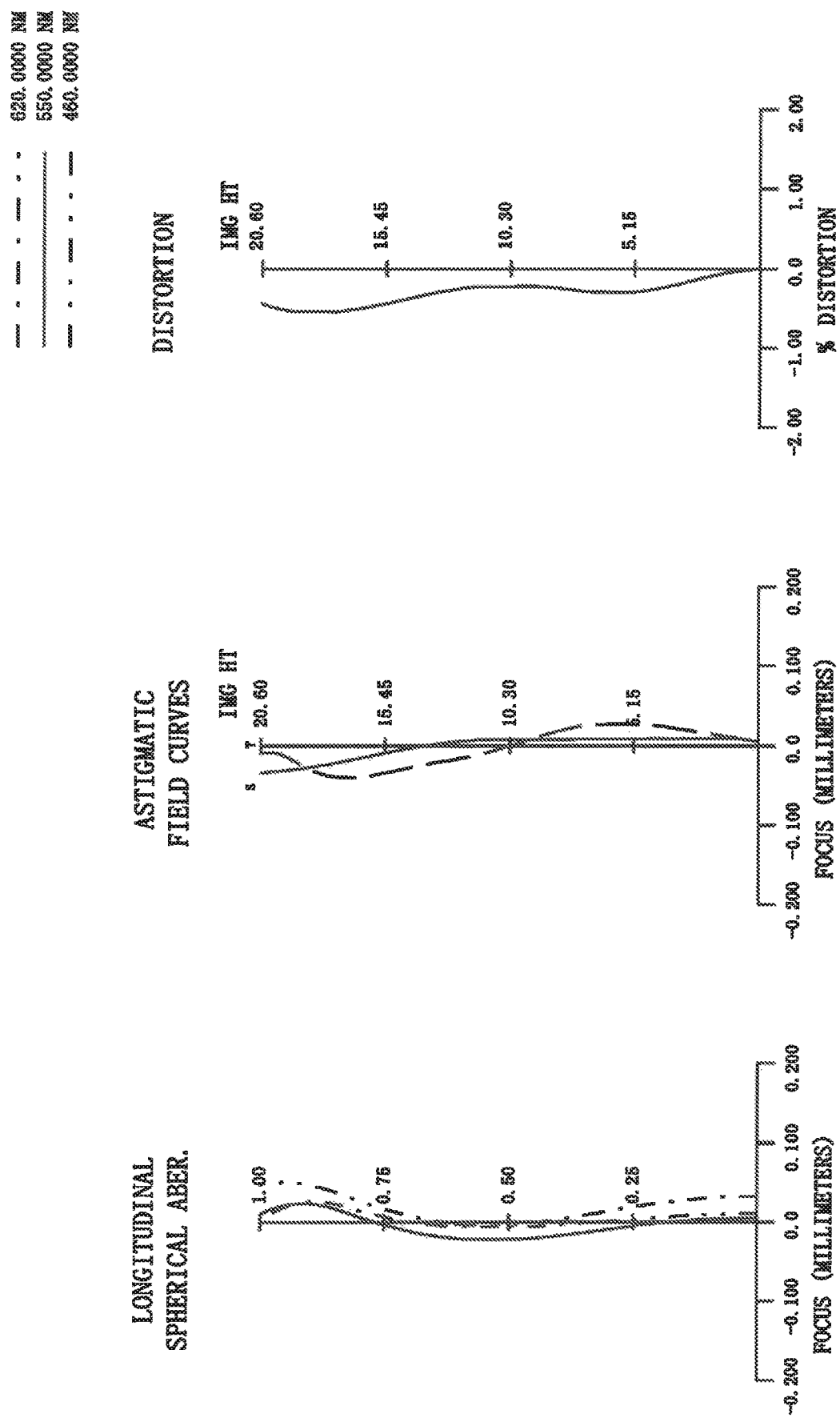
FIG. 3 is an aberration diagram of the projection optical system in the case in which lenses are located at Position 1. Position 1 is a set of positions of the lenses after achieving focusing in the case of setting the on-axis surface distance A, which is the distance between the first lens and unit first lens and the screen S, to 1050 mm.
Figure 4:
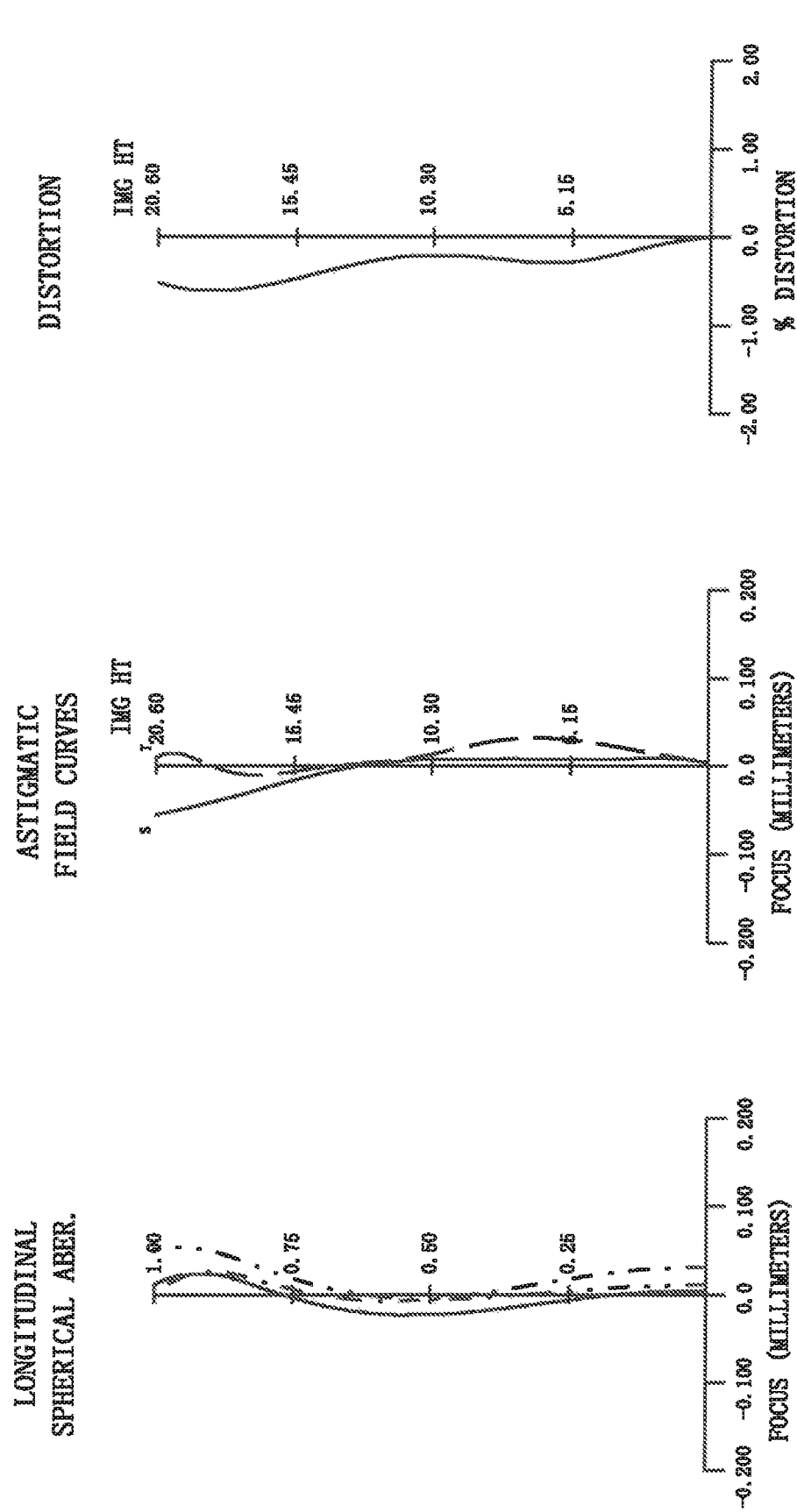
FIG. 4 is an aberration diagram of the projection optical system in the case in which the lenses are located at Position 2. Position 2 is a set of the positions of the lenses in the case od setting the on-axis surface distance A to 720 mm.
Figure 5:
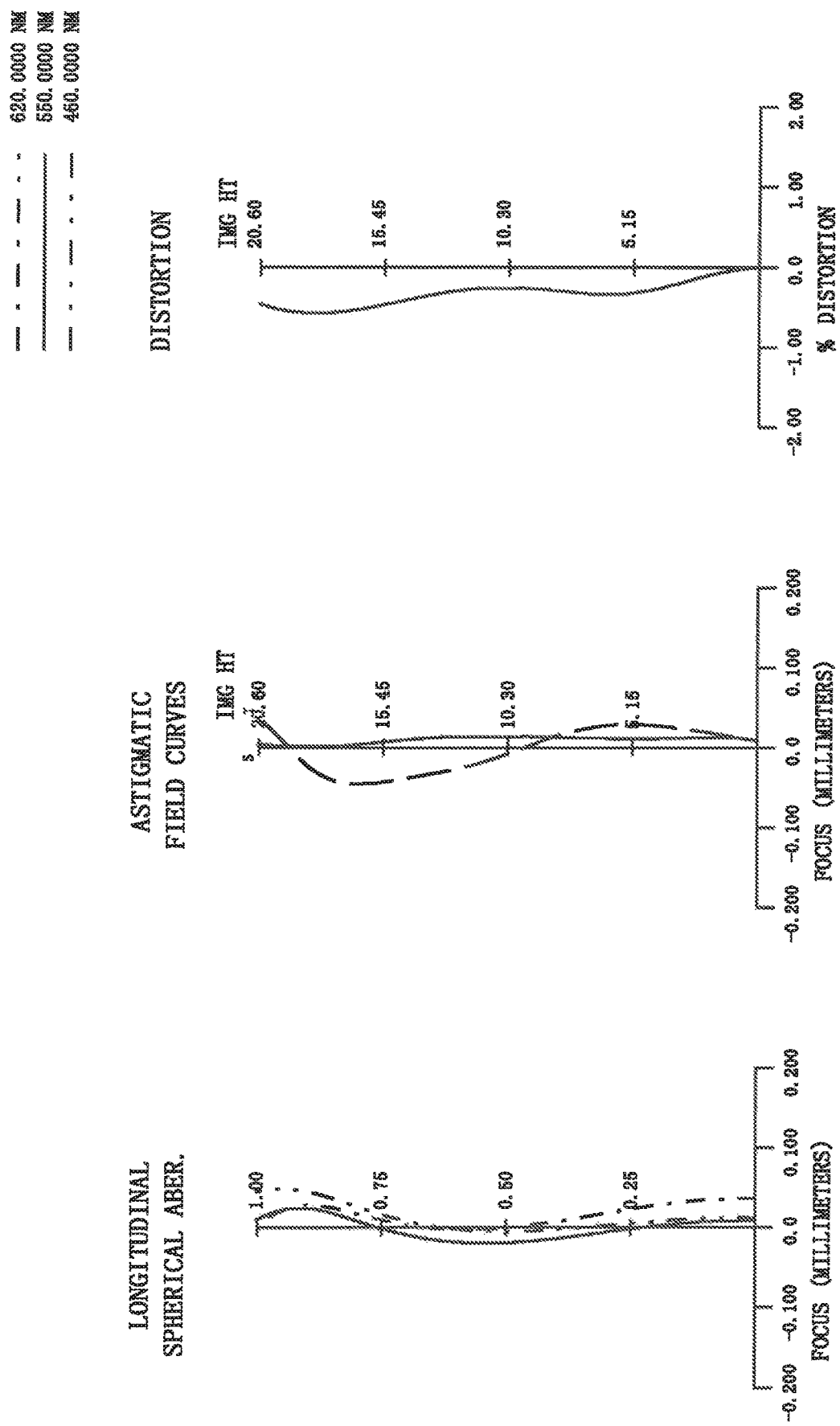
FIG. 5 is an aberration diagram of the projection optical system in the case in which the lenses are located at Position 3. Position 3 is a set of the positions of the lenses in the case of setting the on-axis surface distance A to 2,500 mm.

FIG. 3 is an aberration diagram (a spherical aberration, an astigmatism, and a distortion aberration) in the case in which the lenses of the projection optical system 3A are located at Position 1. FIG. 4 is an aberration diagram (a spherical aberration, an astigmatism, and a distortion aberration) in the case in which the lenses of the projection optical system 3A are located at Position 2. FIG. 5 is an aberration diagram (a spherical aberration, an astigmatism, and a distortion aberration) in the case in which the lenses of the projection optical system 3A are located at Position 3. As shown in FIG. 3 through FIG. 5, in the projection optical system 3A, the spherical aberration, the astigmatism, and the distortion aberration are corrected in good condition.

Figure 6:
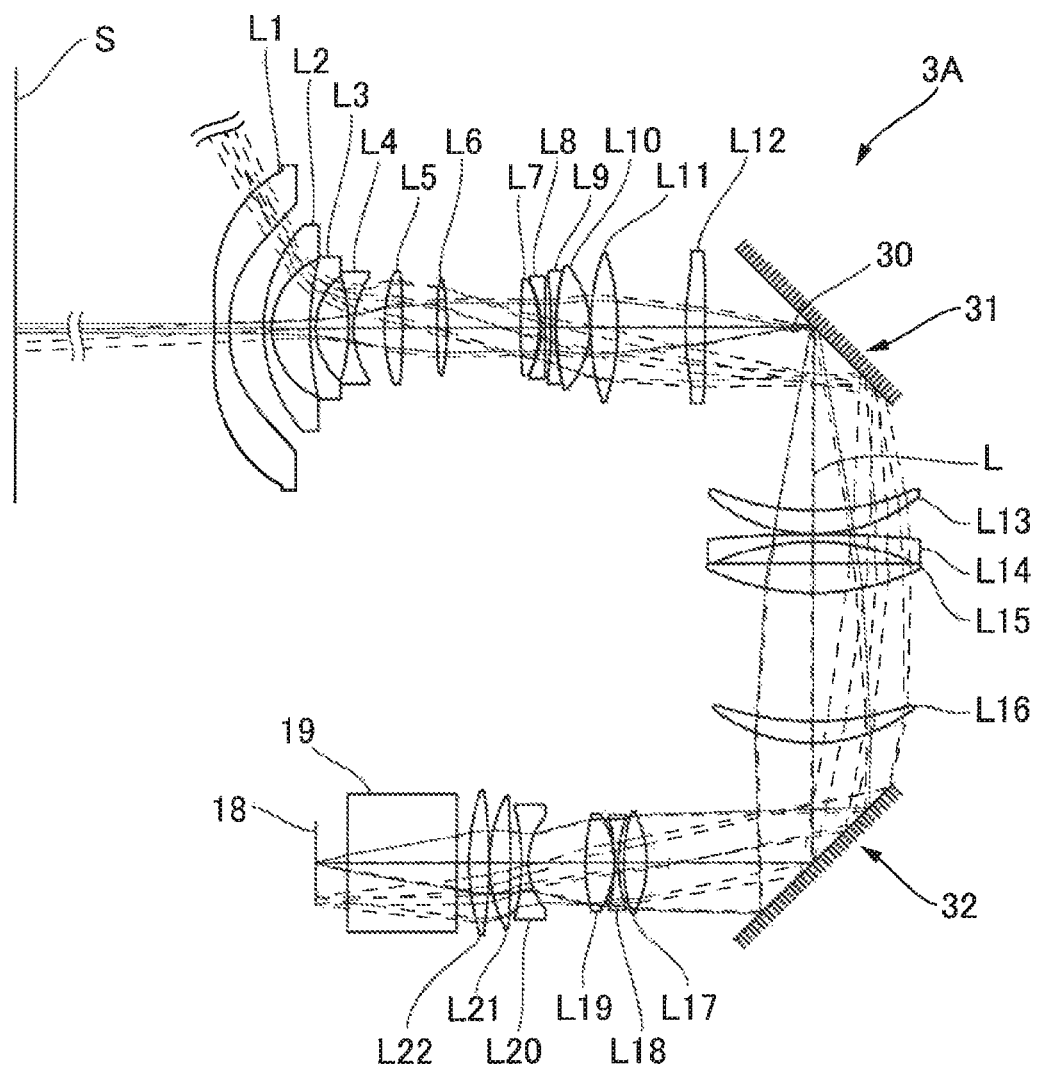
FIG. 6 is a configuration diagram in the case of folding the optical path of the projection optical system of Example 1.

Then, when incorporating the projection optical system 3A into the projector 1, a first mirror 31 (a first light path folding element) is disposed between the first lens unit LU1 and the second lens unit LU2 to fold the light path (the optical axis L) in between as shown in FIG. 6. Further, a second mirror 32 (a second light path folding element) is disposed between the second lens unit fourth lens L16 and the second lens unit fifth lens L17 in the second lens unit LU2 to fold the light path (the optical axis L) in between. If the first mirror 31 and the second mirror 32 are disposed in the projection optical system 3A, it is possible to orient the optical axis L to the desired direction. Therefore, it becomes easy to incorporate the projection optical system 3A into the projector 1.

Here, the distance between the second lens unit fourth lens L16 and the second lens unit fifth lens L17 is the longest in the on-axis surface distance between two lenses adjacent to each other in the second lens unit LU2. Therefore, it is easy to dispose the second mirror 32 between the second lens unit fourth lens L16 and the second lens unit fifth lens L17.

Further, in the present example, no mirror is disposed inside the first lens unit LU1. Therefore, it becomes easy to ensure the positional accuracy of each of the lenses of the first lens unit LU1 compared to the case of disposing the first mirror 31 inside the first lens unit LU1. Further, since the first mirror 31 is not disposed inside the first lens unit LU1, there is no need to provide a space for disposing the first mirror 31 inside the first lens unit LU1, and it is possible to prevent the total lens length LLU1 of the first lens unit LU1 from increasing. Here, the first lens unit LU1 is large in performance deterioration due to the position shift compared to the second lens unit LU2, and is required to be high in positional accuracy of the lenses. Therefore, by refraining from disposing the first mirror 31 in the first lens unit LU1, it is possible to suppress the variation in performance of the projection optical system 3A.

MODIFIED EXAMPLES

It should be noted that defining the three lenses formed of the first lens unit second lens L2, the first lens unit third lens L3, and the first lens unit fourth lens L4 as the first lens group LG1, the first lens unit fifth lens L5 as the second lens group LG2, and the first lens unit sixth lens L6 as a third lens group, in the case of changing the projection size on the screen S in the projection optical system 3A, it is also possible to achieve focusing by moving, the first lens group LG1, the second lens group LG2 and the third lens group in the state of fixing the first lens unit first lens L1. Here, the first lens group LG1 is provided with negative power, the second lens group LG2 is provided with positive power, and the third lens group is provided with positive power. Further, the first lens group LG1 has two or more lenses each provided with negative power. According also to such a configuration, it is possible to achieve focusing while preventing the aberration from occurring when the projection size has been changed.

Further, it is also possible to fold the light path (the optical axis L) using a prism instead of the mirrors 31, 32.

EXAMPLE 2

Figure 7:
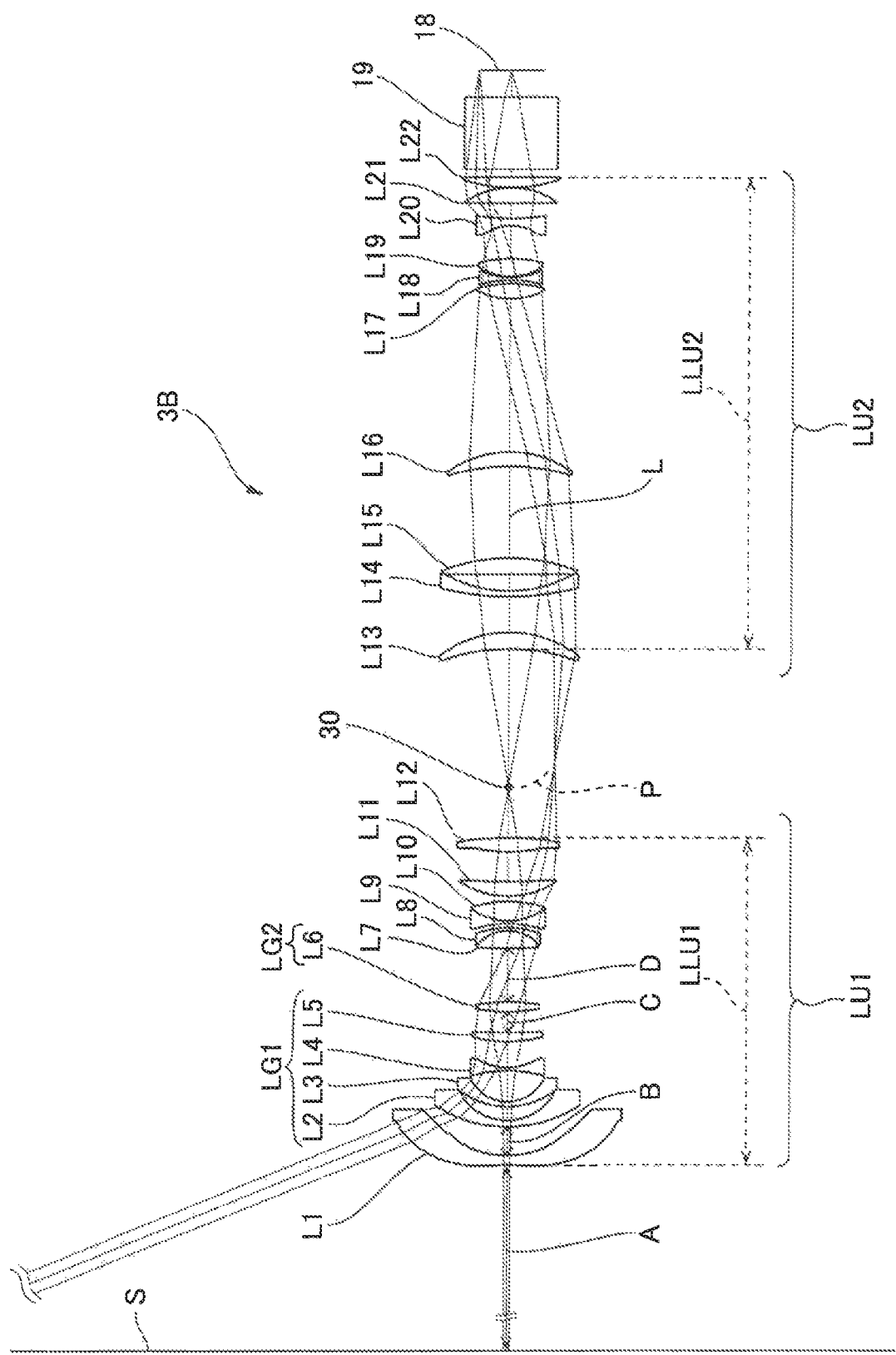
FIG. 7 is a configuration diagram of a projection optical system of Example 2.

FIG. 7 is a configuration diagram (ray chart) of the projection optical system of Example 2. As shown in FIG. 7, the projection optical system 3B of the present example is formed of a first lens unit LU1 for making the screen S as the enlargement-side imaging surface and the intermediate image 30 conjugate with each other, and a second lens unit LU2 for making the intermediate image 30 and the liquid crystal panel 18 (18R, 18G, and 18B) as the v-side imaging surface conjugate with each other. The first lens unit LU1 has positive power. The second lens unit LU2 has negative power.

The first lens unit LU1 is provided with a first lens unit first lens L1 (the first lens unit enlargement-side lens) provided with negative power, a first lens group LG1 provided with negative power, and a second lens group LG2 provided with positive power from the screen S side toward the intermediate image 30.

The first lens unit first lens L1 is an aspherical lens provided with aspherical shapes on the both surfaces.

The first lens group LG1 is provided with the two or more lenses each having negative power. In the present example, the first lens group LG1 is formed of four lenses, namely a first lens unit second lens L2, a first lens unit third lens L3, a first lens unit fourth lens L4, and a first lens unit fifth lens L5 from the screen S side toward the intermediate image 30. The first lens unit second lens L2 and the first lens unit third lens L3 are each provided with negative power, and at the same time each provided with a convex meniscus shape on the screen S side. The first lens unit fourth lens L4 is provided with negative power. The first lens unit fifth lens L5 is provided with positive power.

The second lens group LG2 is formed of a single lens. A first lens unit sixth lens L6 constituting the second lens group LG2 is provided with positive power. Further, the first lens unit sixth lens L6 is provided with convex surfaces on the screen S side and the intermediate image 30 side, respectively.

Further, the first lens unit LU1 is provided with a first lens unit seventh lens L7, a first lens unit eighth lens L8, a first lens unit ninth lens L9, a first lens unit tenth lens L10, a first lens unit eleventh lens L11, and a first lens unit twelfth lens L12 from the second lens group LG2 toward the intermediate image 30. Therefore, the first lens unit LU1 is formed of the 12 lenses. In the present example, the first lens unit seventh lens L7 and the first lens unit eighth lens L8 are formed as a cemented lens. Further, the first lens unit ninth lens L9 and the first lens unit tenth lens L10 are formed as a cemented lens. Further, in the present example, the first lens unit twelfth lens L12 (a first lens unit intermediate image-side lens) is an aspherical lens provided with aspherical shapes on the both surfaces.

The second lens unit LU2 is provided with a second lens unit first lens L13, a second lens unit second lens L14, a second lens unit third lens L15, a second lens unit fourth lens L16, a second lens unit fifth lens L17, a second lens unit sixth lens L18, a second lens unit seventh lens L19, a second lens unit eighth lens L20, a second lens unit ninth lens L21, and a second lens unit tenth lens L22 from the intermediate image 30 side toward the liquid crystal panel 18. Therefore, the second lens unit LU2 is formed of the 10 lenses. Between the second lens unit tenth lens L22 and the liquid crystal panel 18, there is disposed a cross dichroic prism 19.

The second lens unit first lens L13 (the second lens unit intermediate image-side first lens) has positive power. The second lens unit first lens L13 has a meniscus shape provided with a concave surface on the intermediate image 30 side, and a convex surface on the liquid crystal panel 18 side. The second lens unit second lens L14 (the second lens unit intermediate image-side second lens) has negative power. The second lens unit second lens L14 has a meniscus shape provided with a convex surface on the intermediate image 30 side, and a concave surface on the liquid crystal panel 18 side. The second lens unit third lens L15 (the second lens unit intermediate image-side third lens) has positive power. The second lens unit third lens L15 is provided with convex surfaces on the intermediate image 30 side, and the liquid crystal panel 18 side, respectively. The second lens unit fourth lens L16 has negative power. The second lens unit fourth lens L16 has a meniscus shape provided with a concave surface on the intermediate image 30 side, and a convex surface on the liquid crystal panel 18 side.

The second lens unit tenth lens L22 (the second lens unit reduction-side first lens) the closest to the liquid crystal panel 18 in the second lens unit LU2, and the second lens unit ninth lens L21 (the second lens unit reduction-side second lens) located adjacent to the second lens unit tenth lens L22 are each provided with positive power. The second lens unit ninth lens L21 is provided with a convex surface on the liquid crystal panel 18 side. The second lens unit tenth lens L22 is provided with a convex surface on the intermediate image 30 side. Further, the second lens unit eighth lens L20 neighboring on the intermediate image 30 side of the second lens unit ninth lens L21 is an aspherical lens provided with aspherical shapes on the both surfaces.

In the projection optical system 3B, as shown in FIG. 7, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12. The focusing position P of the off-axis light in the intermediate image 30 comes closer to the second lens unit first lens L13 as proceeding toward the off-axis direction.

In the case of changing the projection size on the screen S in the projection optical system 3B, the first lens group LG1 and the second lens group LG2 (the first lens unit fifth lens L5) are moved in the optical axis L direction to achieve focusing in the state of fixing the first lens unit first lens L1.

Here, defining the focal distance of the projection optical system 3B as |f|, the maximum field angle (half field angle) as ω, the F-number as FNo, an effective image circle diameter as φ, an air-conversion value of the back focus as BF, the total lens length of the first lens unit LU1 as LLU1, and the total lens length of the second lens unit LU2 as LLU2, the data of the projection optical system 3B of Example 2 is as follows. It should be noted that the total lens length LLU1 is the distance from the surface on the screen S side of the first lens unit first lens L1 to the surface on the intermediate image 30 side of the first lens unit twelfth lens L12 on the optical axis L. The total lens length LLU2 is the distance from the surface or the intermediate image 30 side of the second lens unit first lens L13 to the surface on the liquid crystal panel 18 side of the second lens unit tenth lens L22 on the optical axis L.

|f|=8.11 mm
ω=68.0°
FNo=1.95
φ=40.4 mm

BF=51.42 mm

LLU1=203.991 mm

LLU2=294.124 mm

Further, the lens data of the projection optical system 3B is as follows. The column of the lens shows the reference symbols attached to the respective lenses shown in FIG. 7. The surfaces having the surface number attached with "*" are aspherical surfaces. The reference symbol R represents a curvature radius. The reference symbol d represents an on-axis surface distance (mm) (lens thickness or a lens distance). The reference symbol nd represents a refractive index. The reference symbol vd represents an Abbe number. It should be noted that the on-axis surface distance A is the distance between the screen S and the first lens unit first lens L1. The on-axis surface distance B is the distance between the first lens unit first lens L1 and the first lens group LG1. The on-axis surface distance C is the distance between the first lens group LG1 and the second lens group LG2 (the first lens unit sixth lens L6). The on-axis surface distance D is the distance between the second lens group LG2 (the first lens unit sixth lens L6) and the first lens unit seventh lens L7. The on-axis surface distance A varies with the projection size, and the on-axis surface distances B, C, and D change due to focusing in the case in which the projection size has been changed.

| LENS | SURFACE NUMBER | R | d | nd | vd |
|---|---|---|---|---|---|
| S |  | INFINITY | A |  |  |
| L1 | *1 | −103.035 | 6 | 1.50942 | 55.88 |
|  | *2 | 96.784 | B |  |  |
| L2 | 3 | 82.65 | 4 | 1.8515 | 40.78 |
|  | 4 | 33.75 | 8.693 |  |  |
| L3 | 5 | 49.65 | 2.94 | 1.8515 | 40.78 |
|  | 6 | 25.55 | 19.268 |  |  |
| L4 | 7 | −85.6 | 2.2 | 1.497 | 81.54 |
|  | 8 | 38.7 | 16.232 |  |  |
| L5 | 9 | 89.55 | 5.44 | 1.84666 | 23.78 |
|  | 10 | 568 | C |  |  |
| L6 | 11 | 104.95 | 6.31 | 1.9165 | 31.6 |
|  | 12 | −119.45 | D |  |  |
| L7 | 13 | 354 | 10.89 | 1.6968 | 55.53 |
| L8 | 14 | −25.35 | 1.8 | 1.80518 | 25.46 |
|  | 15 | −58.8 | 2.57 |  |  |
| L9 | 16 | −65.95 | 1.8 | 1.80518 | 25.46 |
| L10 | 17 | 39.1 | 12.04 | 1.48749 | 70.23 |
|  | 18 | −74.75 | 3.359 |  |  |
| L11 | 19 | 55 | 9.12 | 1.497 | 81.54 |
|  | 20 | 692 | 18.566 |  |  |
| L12 | *21 | 88.914 | 8.56 | 1.693 | 53.18 |
|  | *22 | −177.341 | 117.796 |  |  |
| L13 | 23 | −122.8 | 10.43 | 1.56883 | 56.36 |
|  | 24 | −70.9 | 22.652 |  |  |
| L14 | 25 | 182 | 3.4 | 1.743 | 49.34 |
|  | 26 | 81.7 | 10.492 |  |  |
| L15 | 27 | 5532 | 10.23 | 1.834 | 37.16 |
|  | 28 | −116.85 | 56.962 |  |  |
| L16 | 29 | −136.5 | 8.99 | 1.497 | 81.54 |
|  | 30 | −67.55 | 95.574 |  |  |
| L17 | 31 | 45.3 | 9.43 | 1.497 | 81.54 |
|  | 32 | −79.7 | 2.196 |  |  |
| L18 | 33 | −67.7 | 1.8 | 1.80518 | 25.46 |
|  | 34 | 46.05 | 0.47 |  |  |
| L19 | 35 | 36.5 | 11.25 | 1.497 | 81.54 |
|  | 36 | −74.4 | 20.223 |  |  |
| L20 | *37 | −29.566 | 4.45 | 1.68948 | 31.03 |
|  | *38 | 124.249 | 9.495 |  |  |
| L21 | 39 | INFINITY | 9.63 | 1.92286 | 20.88 |
|  | 40 | −51.65 | 0.2 |  |  |
| L22 | 41 | 99.75 | 6.25 | 1.92286 | 20.86 |
|  | 42 | INFINITY | 5 |  |  |
| (19) | 43 | INFINITY | 45 | 1.5168 | 64.2 |
|  | 44 | INFINITY | 16.75 |  |  |

The coefficients of the odd-order aspheric expression for defining the aspherical shape of each of the surfaces (of the first lens unit first lens L1) with the surface numbers 1, 2 formed as the aspherical surfaces are as follows.

|  | SURFACE NUMBER | |
|---|---|---|
|  | 1 | 2 |
| Y CURVATURE RADIUS | −103.035 | 96.784 |
| CONIC CONSTANT | −26.3 | 1.2322 |
| 3rd-ORDER ASPHERIC COEFFICIENT | 1.48035E−04 | 1.50056E−04 |
| 4th-ORDER ASPHERIC COEFFICIENT | 1.11219E−06 | 6.04831E−07 |
| 5th-ORDER ASPHERIC COEFFICIENT | −7.77974E−08 | −3.10459E−08 |
| 6th-ORDER ASPHERIC COEFFICIENT | 6.30545E−10 | −3.40364E−10 |
| 7th-ORDER ASPHERIC COEFFICIENT | 1.03663E−11 | 9.49749E−14 |
| 8th-ORDER ASPHERIC COEFFICIENT | −1.12241E−13 | −1.58316E−14 |
| 9th-ORDER ASPHERIC COEFFICIENT | −6.28918E−16 | 2.55615E−15 |
| 10th-ORDER ASPHERIC COEFFICIENT | 2.39457E−18 | −2.03155E−17 |
| 11th-ORDER ASPHERIC COEFFICIENT | 2.04099E−20 | 5.14692E−19 |
| 12th-ORDER ASPHERIC COEFFICIENT | −4.97039E−22 | −1.27488E−20 |
| 13th-ORDER ASPHERIC COEFFICIENT | 2.67413E−23 | −1.42360E−22 |
| 14th-ORDER ASPHERIC COEFFICIENT | 3.27174E−25 | 2.59219E−24 |
| 15th-ORDER ASPHERIC COEFFICIENT | −5.66823E−27 | 1.00373E−25 |
| 16th-ORDER ASPHERIC COEFFICIENT | −8.71661E−30 | −7.89080E−28 |
| 17th-ORDER ASPHERIC COEFFICIENT | −9.13214E−31 | −2.09710E−29 |
| 18th-ORDER ASPHERIC COEFFICIENT | 1.31575E−32 | −2.03911E−31 |
| 19th-ORDER ASPHERIC COEFFICIENT | 0.00000E+00 | 5.87905E−33 |

Further, the coefficients of the even-order aspheric expression for defining the aspherical shape of each of the surfaces (of the first lens unit twelfth lens L12) with the surface numbers 21, 22 formed as the aspherical surfaces are as follows.

|  | SURFACE NUMBER | |
|---|---|---|
|  | 21 | 22 |
| Y CURVATURE RADIUS | 88.914 | −177.341 |
| CONIC CONSTANT (K) | 4.655 | −1.233 |
| 4th-ORDER COEFFICIENT (A) | 9.53800E−07 | 8.08155E−06 |
| 6th-ORDER COEFFICIENT (B) | −7.91424E−09 | −1.26942E−08 |
| 8th-ORDER COEFFICIENT (C) | −9.08519E−13 | 4.54625E−13 |
| 10th-ORDER COEFFICIENT (D) | 1.08781E−18 | 4.18613E−15 |
| 12th-ORDER | 4.14086E−19 | −1.51873E−19 |

-continued

| | SURFACE NUMBER | |
|---|---|---|
| | 21 | 22 |
| COEFFICIENT (E) 14th-ORDER | 1.17939E−21 | −1.52875E−22 |
| COEFFICIENT (F) 16th-ORDER | 2.05205E−24 | −1.90536E−25 |
| COEFFICIENT (G) 18th-ORDER | 2.56808E−27 | 1.00490E−27 |
| COEFFICIENT (H) 20th-ORDER | −3.17630E−30 | 0.00000E+00 |
| COEFFICIENT (J) | | |

Further, the coefficients of the even-order aspheric expression for defining the aspherical shape of each of the surfaces (of the second lens unit eighth lens L20) with the surface numbers 37, 38 formed as the aspherical surfaces are as follows.

| | SURFACE NUMBER | |
|---|---|---|
| | 37 | 38 |
| Y CURVATURE RADIUS | −29.566 | 124.249 |
| CONIC CONSTANT (K) | −0.061 | −3.114 |
| 4th-ORDER COEFFICIENT (A) | 7.82032E−07 | −1.83905E−07 |
| 6th-ORDER COEFFICIENT (B) | 8.30939E−10 | 8.92877E−10 |
| 8th-ORDER COEFFICIENT (C) | −3.12271E−12 | −1.76429E−12 |
| 10th-ORDER COEFFICIENT (D) | −6.82839E−15 | 1.43785E−15 |

Then, the on-axis surface distances A, B, C, and D (unit: mm), the focal distance |f| (unit: mm), and the half field angle ω (unit: °) in the case of changing the projection size and then performing focusing are as follows. It should be noted that a set of the positions of the lenses after achieving focusing in the case of setting the on-axis surface distance A, which is the distance between the first lens unit first lens and the screen S, to 1050 mm is defined as Position 1, a set of the positions of the lenses in the case of setting the on-axis surface distance A to 720 mm is defined as Position 2, and a set of the positions of the lenses in the case of setting the on-axis surface distance A to 2500 mm is defined as Position 3.

| | POSITION 1 | POSITION 2 | POSITION 3 |
|---|---|---|---|
| A | 1050 | 720 | 2500 |
| B | 17.691 | 17.885 | 17.403 |
| C | 13.031 | 13.151 | 12.88 |
| D | 33.481 | 33.167 | 33.92 |
| \|f\| | 8.11 | 8.08 | 8.15 |
| ω | 68 | 67.94 | 68 |

According to the projection optical system 3B of the present example, since the second lens unit first lens L13 has positive power, it is easy to form the intermediate image 30 on the first lens unit LU1 side of the second lens unit first lens L13. Further, since the intermediate image 30 is formed using the lens having positive power, it is easy for the second lens unit LU2 to correct the distortion aberration occurring in the first lens unit LU1.

Further, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12, and the focusing position P of the off-axis light in the intermediate image 30 comes closer to the second lens unit first lens L13 as proceeding toward the off-axis direction. Thus, it is easy for the second lens unit LU2 to correct the distortion aberration occurring in the first lens unit LU1, and it is possible to suppress the burden of correcting the aberration by the first lens unit LU1.

Further, in the present example, since the first lens unit first lens L1 and the first lens unit twelfth lens L12 are the aspherical lenses, it is easy to correct the distortion aberration in the first lens unit first lens L1, and it becomes easy to correct the field curvature in the first lens unit twelfth lens L12. Further, since the first lens unit first lens L1 is the aspherical lens, it is easy to reduce the diameter of the first lens unit first lens L1.

Here, the projection optical system 3B satisfies the following conditional expression (1) defining the focal distance of the first lens unit LU1 as fU1, and the focal distance of the second lens unit LU2 as fU2.

$$-0.3 < fU1/fU2 < -0.005 \quad (1)$$

Specifically,
fU1=12.077
fU2=−729.86
and, therefore
fU1/fU2=−0.017
is obtained.

Since the projection optical system 3B of the present example satisfies the conditional expression (1), it is easy to prevent the distortion from occurring in the projection field while preventing the number of lenses from increasing to thereby make the maximum field angle as wide angle as no smaller than 120° (make the half field angle ω no smaller than 60°). That is, if the value of the conditional expression (1) exceeds the lower limit, the focal distance of the first lens unit LU1 becomes too long to easily make the field angle wide angle. Further, if the value of the conditional expression (1) exceeds the lower limit, the tilt of the light beam between the second lens unit LU2 and the intermediate image 30 with respect to the optical axis L becomes large to incur the deterioration of the field curvature, and at the same time, the diameter of the lens (the second lens unit first lens L13) located on the most intermediate image 30 side of the second lens unit LU2 becomes large. In contrast, if the value of the conditional expression (1) exceeds the upper limit, the light beam entering the first lens unit LU1 from the intermediate image 30 side becomes a roughly telecentric light beam or a light beam with the beam diameter increasing. Thus, the load on the first lens unit LU1 increases, and therefore, it is necessary to increase the number of lenses of the first lens unit LU1 in order to correct the aberration.

Further, in the present example, the total lens length LLU1 of the first lens unit LU1 and the total lens length LLU2 of the second lens unit LU2 satisfy the following conditional expression (2).

$$0.5 < LLU1/LLU2 < 0.9 \quad (2)$$

Specifically,
LLU1/LLU2=203.991/294.124=0.69
is obtained.

Therefore, according to the present example, it is easy to make the total lens length LLU1 of the first lens unit LU1 shorter than the total lens length LLU2 of the second lens unit LU2, and thus make the whole of the projection optical system 3B compact.

Further, in the present example, the second lens unit first lens L13 is provided with positive power, the second lens unit second lens L14 is provided with negative power, and the second lens unit third lens L15 is provided with positive power. Further, the second lens unit first lens L13 is provided with a concave surface on the intermediate image 30 side, and the second lens unit second lens L14 is provided with the concave surface on the liquid crystal panel 18 side. In addition thereto, defining the refractive index on the d-line of the second lens unit first lens L13 as nd (21), and the Abbe number as vd (21), the refractive index on the d-line of the second lens unit second lens L14 as nd (22), and the Abbe number as vd (22), the following conditional expression (3) and conditional expression (4) are satisfied.

$$|nd(22)-nd(21)|<0.4 \quad (3)$$

$$|vd(21)-vd(22)|<30 \quad (4)$$

Specifically,
|nd (22)-nd (21)|=|1.743-1.56883|=0.17
and,
|vd (21)-vd (22)|=56.36-49.34=7.02
are obtained.

Since the second lens unit first lens L13, the second lens unit second lens L14, and the second lens unit third lens L15 are provided with the configuration described above, and satisfy the conditional expression (3) and the conditional expression (4), it is possible for the projection optical system 3B to make the aberration occurring at a position high in image height in the second lens unit LU2 appropriate. Thus, it becomes easy for the first lens unit LU1 to correct the aberration occurring in the second lens unit LU2.

Further, in the present example, defining the focal distance on the d-line as f, and the air-conversion value of the overall back focus as BF, the following conditional expression (5) is satisfied.

$$BF/|f|>5 \quad (5)$$

Specifically,
BF/|f|=51.42/8.11=6.3
is obtained.

Since the conditional expression (5) is satisfied, in the projection optical system 3B, a relatively long back focus can be ensured, and it is easy to make the maximum field angle as wide angle as no smaller than 120°.

Further, in the present example, the second lens unit tenth lens L22 located on the most liquid crystal panel 18 side of the second lens unit LU2, and the second lens unit ninth lens L21 located adjacent to the second lens unit tenth lens L22 are each provided with positive power. Further, defining the refractive index on the d-line of the second lens Unit tenth lens L22 as nd (23), and the Abbe number thereof as vd (23), the following conditional expression (6) and conditional expression (7) are satisfied.

$$1.75<nd(23)<2.00 \quad (6)$$

$$20<vd(23)<45 \quad (7)$$

Specifically,
nd (23)=1.92286
vd (23)=20.86
are set.

Since the second lens unit ninth lens L21 and the second lens unit tenth lens L22 are each provided with positive power, and at the same time satisfy the conditional expression (6) and the conditional expression (7), in the projection optical system 3B, it is easy to correct the field curvature and the chromatic aberration.

Figure 8:
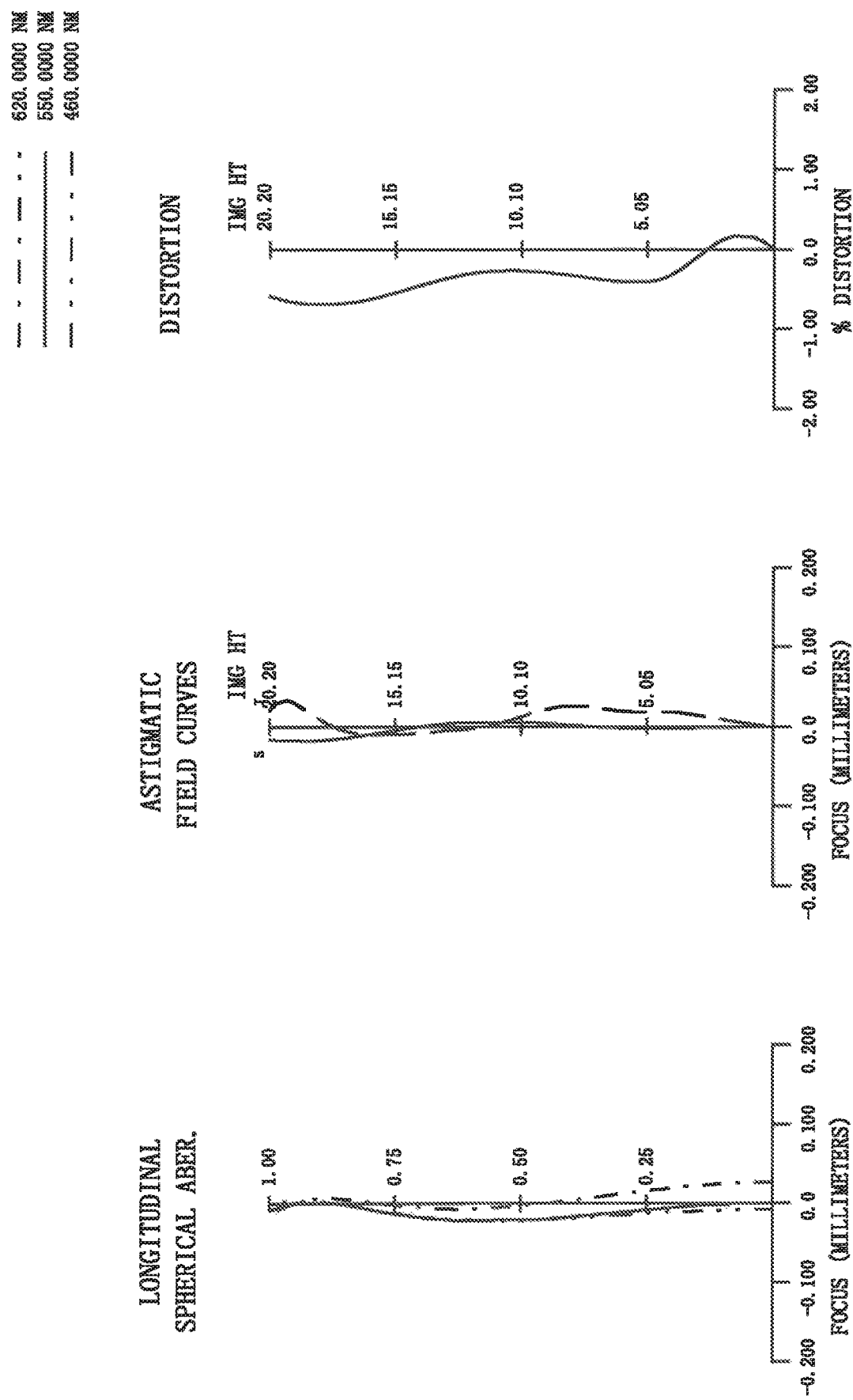
FIG. 8 is an aberration diagram of the projection optical system in the case in which the lenses are located at Position 1.
Figure 9:
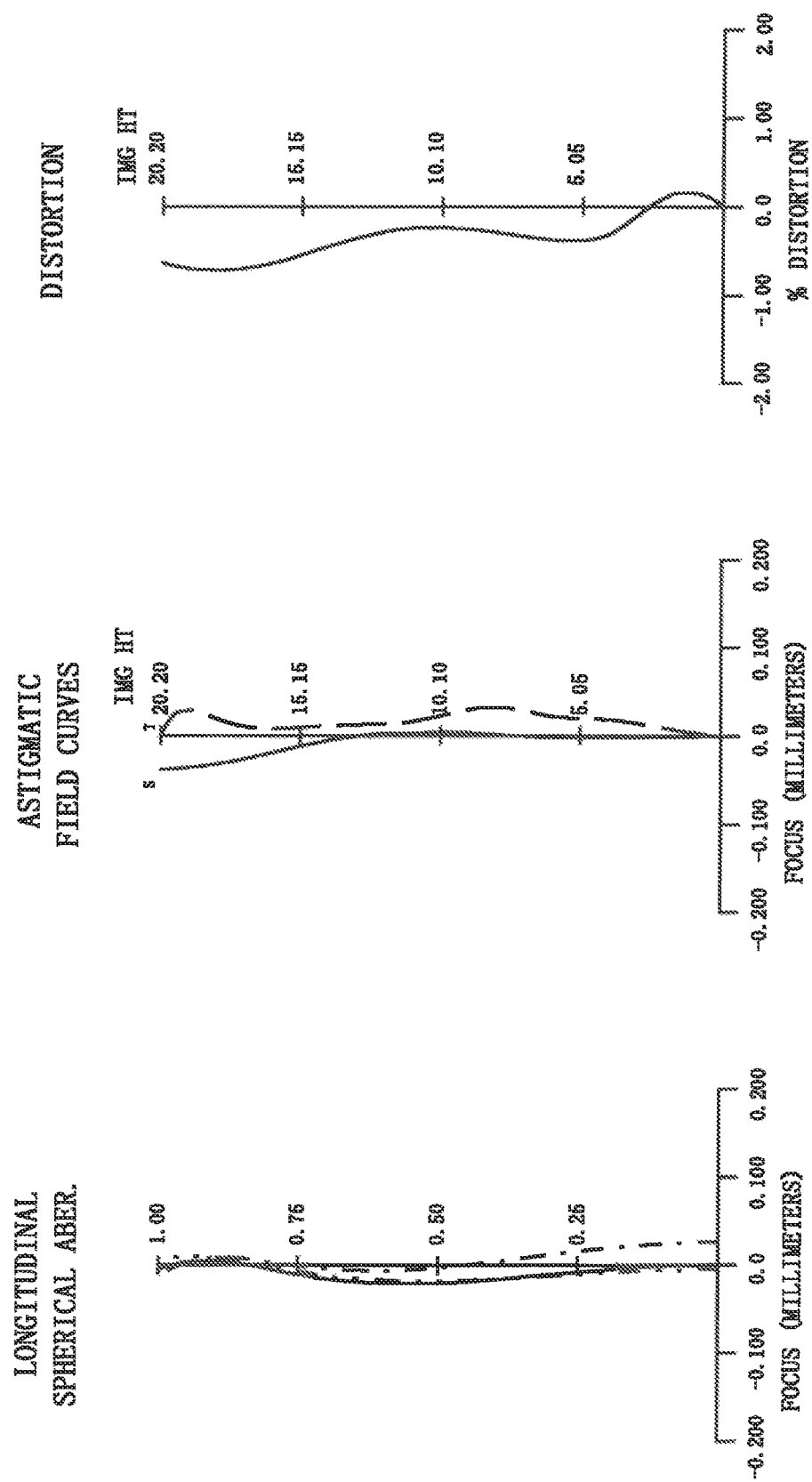
FIG. 9 is an aberration diagram of the projection optical system in the case in which the lenses are located at Position 2.
Figure 10:
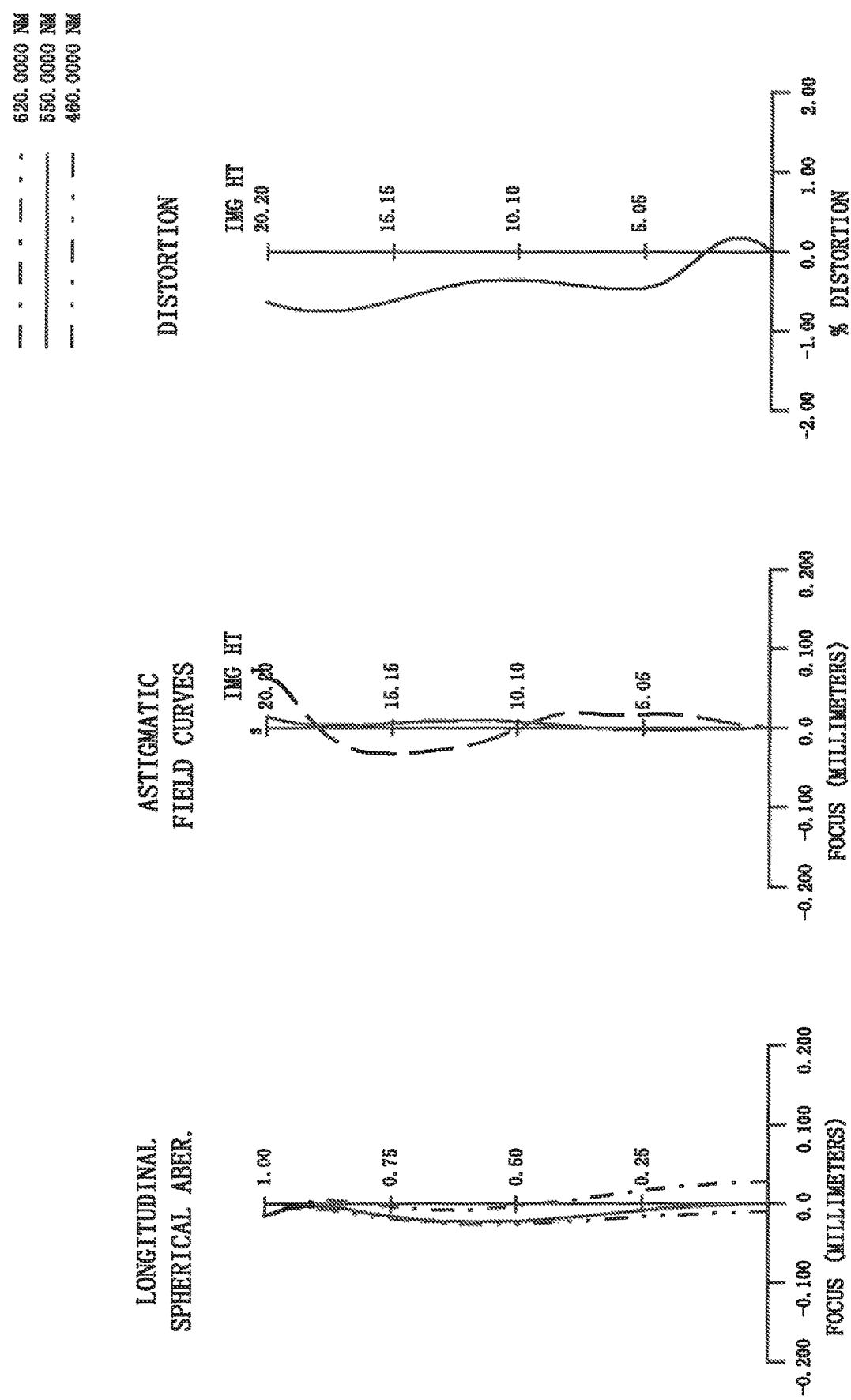
FIG. 10 is an aberration diagram of the projection optical system in the case in which the lenses are located at Position 3.

FIG. 8 is an aberration diagram (a spherical aberration, an astigmatism, and a distortion aberration) in the case in which the lenses of the projection optical system 3B are located at Position 1. FIG. 9 is an aberration diagram (a spherical aberration, an astigmatism, and a distortion aberration) in the case in which the lenses of the projection optical system 3B are located at Position 2. FIG. 10 is an aberration diagram (a spherical aberration, an astigmatism, and a distortion aberration) in the case in which the lenses of the projection optical system 3B are located at Position 3. As shown in FIG. 8 through FIG. 10, in the projection optical system 3B, the spherical aberration, the astigmatism, and the distortion aberration are corrected in good condition.

Figure 11:
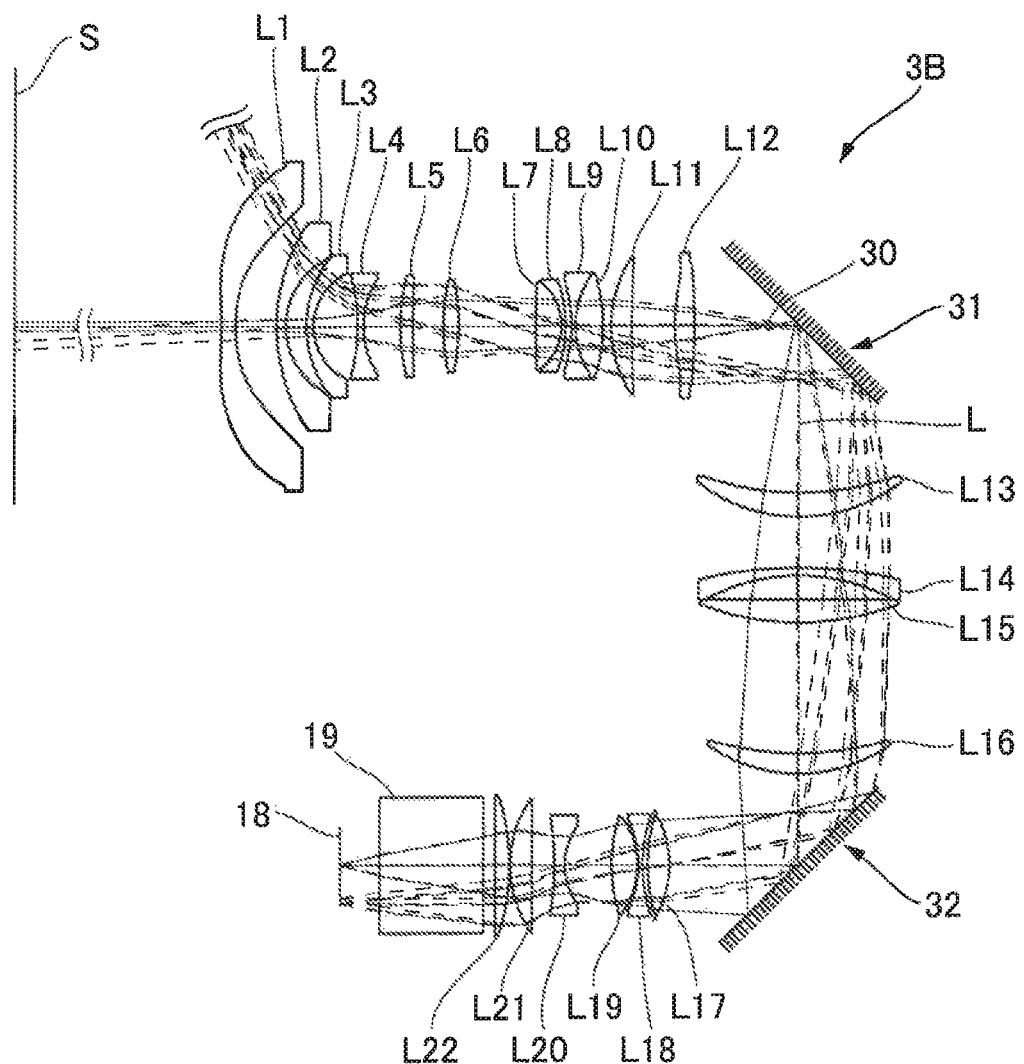
FIG. 11 is a configuration diagram in the case of folding the optical path of the projection optical system of Example 2.

Then, when incorporating the projection optical system 3B into the projector 1, a first mirror 31 (the first light path folding element) is disposed between the first lens unit LU1 and the second lens unit LU2 to fold the light path (the optical axis L) in between as shown in FIG. 11. Further, a second mirror 32 (the second light path folding element) is disposed between the second lens unit fourth lens L16 and the second lens unit fifth lens L17 in the second lens unit LU2 to fold the light path (the optical axis L) in between. If the first mirror 31 and the second mirror 32 are disposed in the projection optical system 3B, it is possible to orient the optical axis L to the desired direction. Therefore, it becomes easy to incorporate the projection optical system 3B into the projector 1.

Here, the distance between the second lens unit fourth lens L16 and the second lens unit fifth lens L17 is the longest in the on-axis surface distance between two lenses adjacent to each other in the second lens unit LU2. Therefore, it is easy to dispose the second mirror 32 between the second lens unit fourth lens L16 and the second lens unit fifth lens L17.

Further, in the present example, no mirror is disposed inside the first lens unit LU1. Therefore, it becomes easy to ensure the positional accuracy of each of the lenses of the first lens unit LU1 compared to the case of disposing the first mirror 31 inside the first lens unit LU1. Further, since the first mirror 31 is not disposed inside the first lens unit LU1, there is no need to provide a space for disposing the first mirror 31 inside the first lens unit LU1, and it is possible to prevent the total lens length LLU1 of the first lens unit LU1 from increasing. Here, the first lens unit LU1 is large in performance deterioration due to the position shift compared to the second lens unit LU2, and is required to be high in positional accuracy of the lenses. Therefore, by refraining from disposing the first mirror 31 in the first lens unit LU1, it is possible to suppress the variation in performance of the projection optical system 3B.

MODIFIED EXAMPLES

It should be noted that defining the three lenses formed of the first lens unit second lens L2, the first lens unit third lens L3, and the first lens unit fourth lens L4 as the first lens group LG1, the first lens unit fifth lens L5 as the second lens group LG2, and the first lens unit sixth lens L6 as a third lens group, in the case of changing the projection size on the screen S in the projection optical system 3B, it is also possible to perform focusing by moving the first lens group LG1, the second lens group LG2 and the third lens group in the state of fixing the first lens unit first lens L1. Here, the first lens group LG1 is provided with negative power, the second lens group LG2 is provided with positive power, and the third lens group is provided with positive power. Further, the first lens group LG1 has two or more lenses each provided with negative power. According also to such a configuration, it is possible to achieve focusing while preventing the aberration from occurring when the projection size has been changed.

Further, it is also possible to fold the light path (the optical axis L) using a prism instead of the mirrors 31, 32.

EXAMPLE 3

Figure 12:
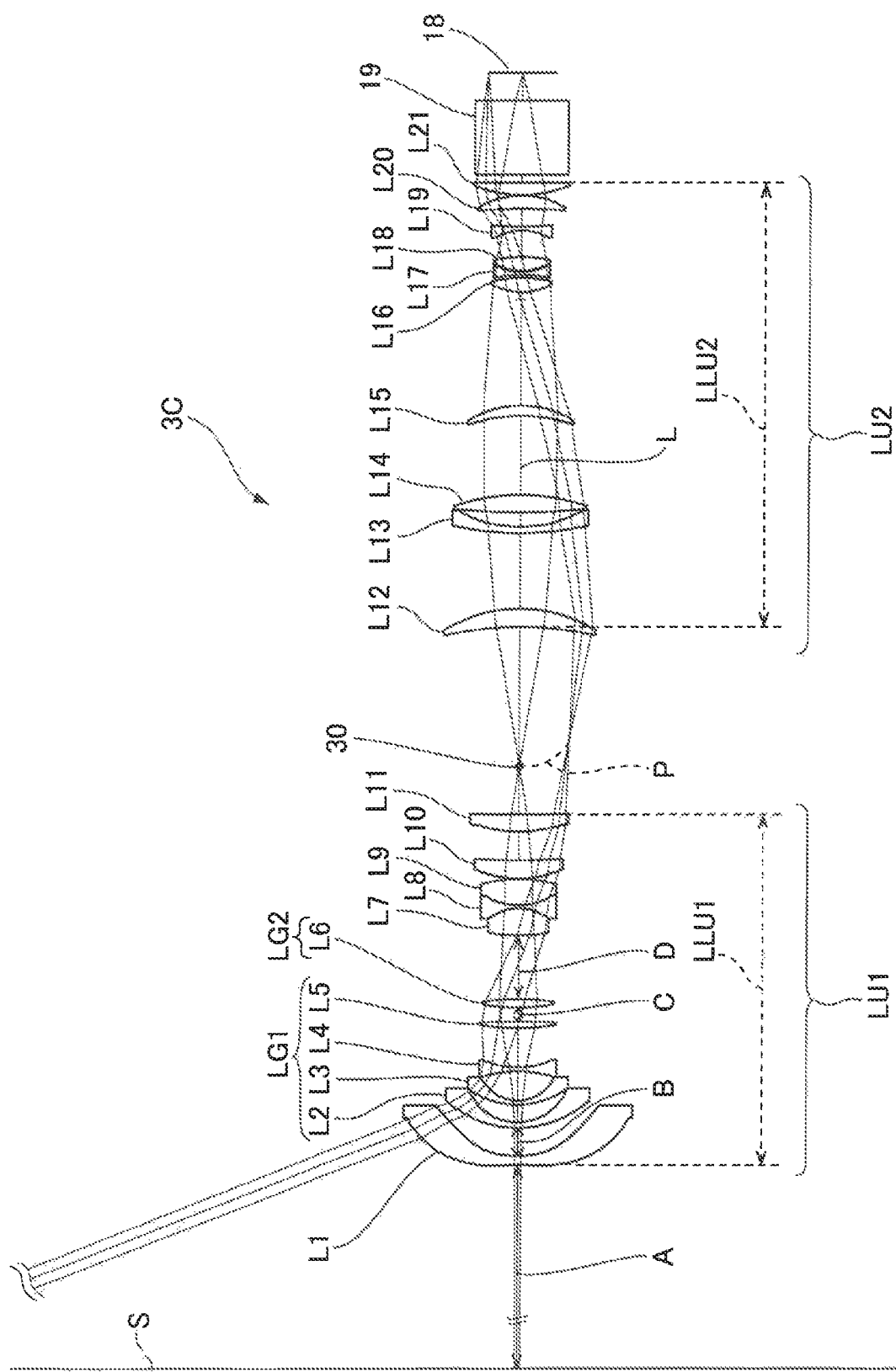
FIG. 12 is a configuration diagram of a projection optical system of Example 3.

FIG. 12 is a configuration diagram (ray chart) of the projection optical system of Example 3. As shown in FIG. 12, the projection optical system 30 of the present example is formed of a first lens unit LU1 for making the screen S as the enlargement-side imaging surface and the intermediate image 30 conjugate with each other, and a second lens unit LU2 for making the intermediate image 30 and the liquid crystal panel 18 (18R, 18G, and 18B) as the reduction-side imaging surface conjugate with each other. The first lens unit LU1 has positive power. The second lens unit LU2 has negative power.

The first lens unit LU1 is provided with a first lens unit first lens L1 (the first lens unit enlargement-side lens) provided with negative power, a first lens group LG1 provided with negative power, and a second lens group LG2 provided with positive power from the screen S side toward the intermediate image 30.

The first lens unit first lens L1 is an aspherical lens provided with aspherical shapes on the both surfaces.

The first lens group LG1 is provided with the two or more lenses each having negative power. In the present example, the first lens group LG1 is formed of four lenses, namely a first lens unit second lens L2, a first lens unit third lens L3, a first lens unit fourth lens L4, and a first lens unit fifth lens L5 from the screen S side toward the intermediate image 30. The first lens unit second lens L2 and the first lens unit third lens L3 are each provided with negative power, and at the same time each provided with a convex meniscus shape on the screen S side. The first lens unit fourth lens L4 is provided with negative power, and at the same time is provided with concave surfaces on the screen S side and the intermediate image 30 side, respectively. The first lens unit fifth lens L5 is provided with positive power, and is provided with convex surfaces on the screen S side and the intermediate image 30 side, respectively.

The second lens group LG2 is formed of a single lens. A first lens unit sixth lens L6 constituting the second lens group LG2 is provided with positive power. Further, the first lens unit sixth lens L6 is provided with convex surfaces on the screen S side and the intermediate image 30 side, respectively.

Further, the first lens unit LU1 is provided with a first lens unit seventh lens L7, a first lens unit eighth lens L8, a first lens unit ninth lens L9, a first lens unit tenth lens L10, and a first lens unit eleventh lens L11 from the second lens group LG2 toward the intermediate image 30. Therefore, the first lens unit LU1 is formed of the 11 lenses. The first lens unit seventh lens L7, the first lens unit eighth lens L8 and the first lens unit ninth lens L9 constitute a cemented lens. In the present example, the first lens unit eleventh lens L11 (the first lense unit intermediate image-side lens) is an aspherical lens provided with aspherical shapes on the both surfaces.

The second lens unit LU2 is provided with a second lens unit first lens L12, a second lens unit second lens L13, a second lens unit third lens L14, a second lens unit fourth lens L15, a second lens unit fifth lens L16, a second lens unit sixth lens L17, a second lens unit seventh lens L18, a second lens unit eighth lens L19, a second lens unit ninth lens L20, and a second lens unit tenth lens L21 from the intermediate image 30 side toward the liquid crystal panel 18. Therefore, the second lens unit LU2 is formed of the 10 lenses. Between the second lens unit fourth lens L15 and the second lens unit fifth lens L16, there is disposed a stop. Between the second lens unit tenth lens L21 and the liquid crystal panel 18, there is disposed a cross dichroic prism 19.

The second lens unit first lens L12 (the second lens unit intermediate image-side first lens) has positive power. The second lens unit first lens L12 has a meniscus shape provided with a concave surface on the intermediate image 30 side, and a convex surface on the liquid crystal panel 18 side. The second lens unit second lens L13 (the second lens unit intermediate image-side second lens) has negative power. The second lens unit second lens L13 has a meniscus shape provided with a convex surface on the intermediate image 30 side, and a concave surface on the liquid crystal panel 18 side. The second lens unit third lens L14 (the second lens unit intermediate image-side third lens) has positive power. The second lens unit third lens L14 is provided with convex surfaces on the intermediate image 30 side, and the liquid crystal panel 18 side, respectively. The second lens unit fourth lens L15 has negative power. The second lens unit fourth lens L15 has a meniscus shape provided with a concave surface on the intermediate image 30 side, and a convex surface on the liquid crystal panel 18 side.

The second lens unit tenth lens L21 (the second lens unit reduction-side first lens) the closest to the liquid crystal panel 18 in the second lens unit LU2, and the second lens unit ninth lens L20 (the second lens unit reduction-side second lens) located adjacent to the second lens unit tenth lens L21 are each provided with positive power. The second lens unit ninth lens L20 is provided with a convex surface on the liquid crystal panel 18 side. The second lens unit tenth lens L21 is provided with a convex surface on the intermediate image 30 side. Further, the second lens unit eighth lens L19 neighboring on the intermediate image 30 side of the second lens unit ninth lens L20 is an aspherical lens provided with aspherical shapes on the both surfaces.

In the projection optical system 3C, as shown in FIG. 12, a principal beam of an off-axis light beam passing between the first lens unit eleventh lens L11 and the second lens unit first lens L12 respectively located on the both sides across the intermediate image 30 comes closer to the optical axis L as proceeding from the second lens unit first lens L12 toward the first lens unit eleventh lens L11. The focusing position P of the off-axis light in the intermediate image 30 comes closer to the second lens unit first lens L12 as proceeding toward the off-axis direction.

In the case of changing the projection size on the screen S in the projection optical system 3C, the first lens group LG1 and the second lens group LG2 (the first lens unit sixth lens L6) are moved in the optical axis L direction to achieve focusing in the state of fixing the first lens unit first lens L1.

Here, defining the focal distance of the projection optical system 3C as $|f|$, the maximum field angle (half field angle) as $\omega$, the F-number as FNo, an effective image circle diameter as $\phi$, an air-conversion value of the back focus as BF, the total lens length of the first lens unit LU1 as LLU1, and the total lens length of the second lens unit LU2 as LLU2, the data of the projection optical system 3C of Example 3 is as follows. It should be noted that the total lens length LLU1 is the distance from the surface on the screen S side of the first lens unit first lens L1 to the surface on the intermediate image 30 side of the first lens unit eleventh lens L11 on the optical axis L. The total lens length LLU2 is the distance from the surface on the intermediate image 30 side of the second lens unit first lens L12 to the surface or the liquid crystal panel 18 side of the second lens unit tenth lens L21 on the optical axis L.

|f|=8.05 mm
ω=68.6°
FNo=2.00
φ=41.2 mm
BF=51.77 mm
LLU1=214.973 mm
LLU2=271.63 mm

Further, the lens data of the projection optical system 3C is as follows. The column of the lens shows the reference symbols attached to the respective lenses shown in FIG. 12. The surfaces having the surface number attached with "*" are aspherical surfaces. The reference symbol R represents a curvature radius. The reference symbol d represents an on-axis surface distance (mm) (lens thickness or a lens distance). The reference symbol nd represents a refractive index. The reference symbol vd represents an Abbe number. It should be noted that the on-axis surface distance A is the distance between the screen S and the first lens unit first lens L1. The on-axis surface distance B is the distance between the first lens unit first lens L1 and the first lens group LG1. The on-axis surface distance C is the distance between the first lens group LG1 and the second lens group LG2 (the first lens unit sixth lens L6). The on-axis surface distance D is the distance between the second lens group LG2 (the first lens unit sixth lens L6) and the first lens unit seventh lens L7. The on-axis surface distance A varies with the projection size, and the on-axis surface distances B, C, and D change due to focusing in the case in which the projection size has been changed.

| LENS | SURFACE NUMBER | R | d | nd | vd |
|---|---|---|---|---|---|
| S |  | INFINITY | A |  |  |
| L1 | *1 | −96.703 | 5.5 | 1.50942 | 55.88 |
|  | *2 | 99.758 | B |  |  |
| L2 | 3 | 66.291 | 3.4 | 1.8515 | 40.78 |
|  | 4 | 32.717 | 10.862 |  |  |
| L3 | 5 | 51.76 | 2.4 | 1.8515 | 40.78 |
|  | 6 | 24.481 | 17.994 |  |  |
| L4 | 7 | −70.525 | 2.2 | 1.497 | 81.54 |
|  | 8 | 49.107 | 24.31 |  |  |
| L5 | 9 | 138.637 | 3.9 | 1.85026 | 32.27 |
|  | 10 | −633.956 | C |  |  |
| L6 | 11 | 121.765 | 5.28 | 1.9036 | 31.32 |
|  | 12 | −130.414 | D |  |  |
| L7 | 13 | 102.715 | 16.63 | 1.6968 | 55.53 |
| L8 | 14 | −29.358 | 1.8 | 1.80518 | 25.46 |
| L9 | 15 | 39.792 | 16.05 | 1.437 | 95.1 |
|  | 16 | −85.724 | 0.2 |  |  |
| L10 | 17 | 63.55 | 11.12 | 1.53775 | 74.7 |
|  | 18 | 346.416 | 17.704 |  |  |
| L11 | *19 | 79.016 | 10.7 | 1.693 | 53.21 |
|  | *20 | −217.865 | 114.848 |  |  |
| L12 | 21 | −197.242 | 11.18 | 1.834 | 37.16 |
|  | 22 | −88.897 | 46.212 |  |  |
| L13 | 23 | 192.954 | 3.8 | 1.8061 | 33.27 |
|  | 24 | 79.480 | 8.992 |  |  |
| L14 | 25 | 393.353 | 10.68 | 1.8515 | 40.78 |
|  | 26 | −127.066 | 48.285 |  |  |
| L15 | 27 | −99.912 | 6.27 | 1.497 | 81.54 |
|  | 28 | −61.703 | 64.794 |  |  |
| (STOP) | 29 | INFINITY | 4.726 |  |  |
| L16 | 30 | 38.234 | 8.59 | 1.437 | 95.1 |
|  | 31 | −79.843 | 1.94 |  |  |
| L17 | 32 | −82.037 | 1.8 | 1.80518 | 25.46 |
|  | 33 | 3.60E+01 | 0.618 |  |  |
| L18 | 34 | 33.809 | 8.58 | 1.497 | 81.54 |
|  | 35 | −75.075 | 16.121 |  |  |
| L19 | *36 | −30.692 | 2.2 | 1.68893 | 31.09 |
|  | *37 | 167.281 | 11.052 |  |  |
| L20 | 38 | −359.843 | 8.15 | 1.92286 | 20.88 |
|  | 39 | −51.036 | 0.2 |  |  |
| L21 | 40 | 76.25 | 7.44 | 1.84666 | 23.78 |
|  | 41 | INFINITY | 5 |  |  |
| (19) | 42 | INFINITY | 45 | 1.51633 | 64.14 |
|  | 43 | INFINITY | 17.112 |  |  |

The coefficients of the odd-order aspheric expression for defining the aspherical shape of each of the surfaces (of the first lens unit first lens L1) with the surface numbers 1, 2 formed as the aspherical surfaces are as follows.

|  | SURFACE NUMBER | |
|---|---|---|
|  | 1 | 2 |
| Y CURVATURE RADIUS | −96.703 | 99.758 |
| CONIC CONSTANT | −49.86 | 1.83 |
| 3rd-ORDER ASPHERIC COEFFICIENT | 1.52345E−04 | 2.08000E−04 |
| 4th-ORDER ASPHERIC COEFFICIENT | 1.09000E−06 | 9.09000E−07 |
| 5th-ORDER ASPHERIC COEFFICIENT | −7.81000E−08 | −4.27000E−08 |
| 6th-ORDER ASPHERIC COEFFICIENT | 6.29000E−10 | −4.52000E−10 |
| 7th-ORDER ASPHERIC COEFFICIENT | 1.04000E−11 | −2.12000E−13 |
| 8th-ORDER ASPHERIC COEFFICIENT | −1.11000E−13 | −8.33000E−16 |
| 9th-ORDER ASPHERIC COEFFICIENT | −6.30000E−16 | 2.92000E−15 |
| 10th-ORDER ASPHERIC COEFFICIENT | 3.02000E−18 | −1.61000E−17 |
| 11th-ORDER ASPHERIC COEFFICIENT | 9.12000E−21 | 5.83000E−19 |
| 12th-ORDER ASPHERIC COEFFICIENT | −4.94000E−22 | −1.24000E−20 |
| 13th-ORDER ASPHERIC COEFFICIENT | 3.29000E−23 | −1.53000E−22 |
| 14th-ORDER ASPHERIC COEFFICIENT | 2.69000E−25 | 2.30000E−24 |
| 15th-ORDER ASPHERIC COEFFICIENT | −6.19000E−27 | 6.29000E−26 |
| 16th-ORDER ASPHERIC COEFFICIENT | −1.07000E−29 | −9.30000E−28 |
| 17th-ORDER ASPHERIC COEFFICIENT | −8.88000E−31 | −2.13000E−29 |
| 18th-ORDER ASPHERIC COEFFICIENT | 1.46000E−32 | −1.59000E−31 |
| 19th-ORDER ASPHERIC COEFFICIENT |  | 7.67000E−33 |

Further, the coefficients of the even-order aspheric expression for defining the aspherical shape of each of the surfaces (of the first lens unit eleventh lens L11) with the surface numbers 19, 20 formed as the aspherical surfaces are as follows.

|  | SURFACE NUMBER | |
|---|---|---|
|  | 19 | 20 |
| Y CURVATURE RADIUS | 79.016 | −217.865 |
| CONIC CONSTANT (K) | 4.823 | 0.000 |

-continued

| | SURFACE NUMBER | |
|---|---|---|
| | 19 | 20 |
| 4th-ORDER COEFFICIENT (A) | 1.78472E−06 | 1.04211E−05 |
| 6th-ORDER COEFFICIENT (B) | −7.14453E−09 | −1.18147E−08 |
| 8th-ORDER COEFFICIENT (C) | −2.30325E−13 | −1.53408E−13 |
| 10th-ORDER COEFFICIENT (D) | −2.23283E−16 | 4.34881E−15 |
| 12th-ORDER COEFFICIENT (E) | −1.96640E−20 | 3.99251E−19 |
| 14th-ORDER COEFFICIENT (F) | 8.94749E−22 | 2.58733E−22 |
| 16th-ORDER COEFFICIENT (G) | 1.87247E−24 | −4.35760E−25 |
| 18th-ORDER COEFFICIENT (H) | 2.28267E−27 | 2.37122E−28 |
| 20th-ORDER COEFFICIENT (J) | −3.79605E−30 | 0.00000E+00 |

Further, the coefficients of the even-order aspheric expression for defining the aspherical shape of each of the surfaces (of the second lens unit eighth lens L19) with the surface numbers 36, 37 formed as the aspherical surfaces are as follows.

| | SURFACE NUMBER | |
|---|---|---|
| | 36 | 37 |
| Y CURVATURE RADIUS | −30.692 | 167.281 |
| CONIC CONSTANT (K) | −0.197 | −33.539 |
| 4th-ORDER COEFFICIENT (A) | 1.29653E−07 | −9.52211E−08 |
| 6th-ORDER COEFFICIENT (B) | 1.16767E−09 | 4.89031E−10 |
| 8th-ORDER COEFFICIENT (C) | −3.05397E−12 | −6.12762E−13 |
| 10th-ORDER COEFFICIENT (D) | −2.57851E−15 | 1.67108E−15 |

Then, the on-axis surface distances A, B, C, and D (unit: mm), the focal distance |f| (unit: mm), and the half field angle ω (unit: °) in the case of changing the projection size and then performing focusing are as follows. It should be noted that a set of the positions of the lenses after achieving focusing in the case of setting the on-axis surface distance A, which is the distance between the first lens unit first lens and the screen S, to 1050 mm is defined as Position 1, a set of the positions of the lenses in the case of setting the on-axis surface distance A to 720 mm is defined as Position 2, and a set of the positions of the lenses in the case of setting the on-axis surface distance A to 2500 mm is defined as Position 3.

| | POSITION 1 | POSITION 2 | POSITION 3 |
|---|---|---|---|
| A | 1050 | 720 | 2500 |
| B | 17.106 | 17.279 | 16.812 |
| C | 8.774 | 8.934 | 8.571 |
| D | 39.053 | 38.72 | 39.55 |
| |f| | 8.05 | 8.02 | 8.09 |
| ω | 68.6 | 68.6 | 68.6 |

According to the projection optical system 3C of the present example, since the second lens unit first lens L12 has positive power, it is easy to form the intermediate image 30 on the first lens unit LU1 side of the second lens unit first lens L12. Further, since the intermediate image 30 is formed using the lens having positive power, it is easy for the second lens unit LU2 to correct the distortion aberration occurring in the first lens unit LU1.

Further, a principal beam of an off-axis light beam passing between the first lens unit eleventh lens L11 and the second lens unit first lens L12 respectively located on the both sides across the intermediate image 30 comes closer to the optical axis L as proceeding from the second lens unit first lens L12 toward the first lens unit eleventh lens L11, and the focusing position P of the off-axis light in the intermediate image 30 comes closer to the second lens unit first lens L12 as proceeding toward the off-axis direction. Thus, it is easy for the second lens unit LU2 to correct the distortion aberration occurring in the first lens unit LU1, and it is possible to suppress the burden of correcting the aberration by the first lens un it LU1.

Further, in the present example, since the first lens unit first lens L1 and the first lens unit eleventh lens L11 are the aspherical lenses, it is easy to correct the distortion aberration in the first lens unit first lens L1, and it becomes easy to correct the field curvature in the first lens unit eleventh lens L11. Further, since the first lens unit first lens L1 is the aspherical lens, it is easy to reduce the diameter of the first lens unit first lens L1.

Here, the projection optical system 3C satisfies the following conditional expression (1) defining the focal distance of the first lens unit LU1 as fU1, and the focal distance of the second lens unit LU2 as fU2.

$$-0.3 < fU1/fU2 < -0.005 \qquad (1)$$

Specifically,
fU1=11.98
fU2=−517.88
and, therefore
fU1/fU2=−0.023
is obtained.

Since the projection optical system 3C of the present example satisfies the conditional expression (1), it is easy to prevent the distortion from occurring in the projection field while preventing the number of lenses from increasing to thereby make the maximum field angle as wide angle as no smaller than 120° (make the half field angle ω no smaller than 60°). That is, if the value of the conditional expression (1) exceeds the lower limit, the focal distance of the first lens unit LU1 becomes too long to easily make the field angle wide angle. Further, if the value of the conditional expression (1) exceeds the lower limit, the tilt of the light beam between the second lens unit LU2 and the intermediate image 30 with respect to the optical axis L becomes large to incur the deterioration of the field curvature, and at the same time, the diameter of the lens (the second lens unit first lens L12) located on the most intermediate image 30 side of the second lens unit LU2 becomes large. In contrast, if the value of the conditional expression (1) exceeds the upper limit, the light beam entering the first lens unit LU1 from the intermediate image 30 side becomes a roughly telecentric light beam or a light beam with the beam diameter increasing. Thus, the load on the first lens unit LU1 increases, and therefore, it is necessary to increase the number of lenses of the first lens unit LU1 in order to correct the aberration.

Further, in the present example, the total lens length LLU1 of the first lens unit LU1 and the total lens length LLU2 of the second lens unit LU2 satisfy the following conditional expression (2).

$$0.5 < LLU1/LLU2 < 0.9 \qquad (2)$$

Specifically,

LLU1/LLU2=214.973/271.63=0.79 is obtained.

Therefore, according to the present example, it is easy to make the total lens length LLU1 of the first lens unit LU1 shorter than the total lens length LLU2 or the second lens unit LU2, and thus make the whole of the projection optical system 3C compact.

Further, in the present example, the second lens unit first lens L12 is provided with positive power, the second lens unit second lens L13 is provided with negative power, and the second lens unit third lens L14 is provided with positive power. Further, the second lens unit first lens L12 is provided with a concave surface on the intermediate image 30 side, and the second lens unit second lens L13 is provided with the concave surface on the liquid crystal panel 18 side. In addition thereto, defining the refractive index on the d-line of the second lens unit first lens L12 as nd (21), and the Abbe number as vd (21), the refractive index on the d-line of the second lens unit second lens L13 as nd (22), and the Abbe number as vd (22), the following conditional expression (3) and conditional expression (4) are satisfied.

$$|nd(22)-nd(21)|<0.4 \quad (3)$$

$$|vd(21)-vd(22)|<30 \quad (4)$$

Specifically,

|nd (22)−nd (21)|=|1.8061−1.834|=0.03 and,

|vd (21)−vd (22)|=37.16−33.27=3.89 are obtained.

Since the second lens unit first lens L12, the second lens unit second lens L13, and the second lens unit third lens L14 are provided with the configuration described above, and satisfy the conditional expression (3) and the conditional expression (4), it is possible for the projection optical system 3C to make the aberration occurring at a position high in image height in the second lens unit LU2 appropriate. Thus, it becomes easy for the first lens unit LU1 to correct the aberration occurring in the second lens unit LU2.

Further, in the present example, defining the focal distance on the d-Line as f, and the air-conversion value of the overall back focus as BF, the following conditional expression (5) is satisfied.

$$BF/|f|>5 \quad (5)$$

Specifically,

BF/|f|=51.78/8.05=6.4 is obtained.

Since the conditional expression (5) is satisfied, in the projection optical system 3C, a relatively long back focus can be ensured, and it is easy to make the maximum field angle as wide angle as no smaller than 120°.

Further, in the present example, the second lens unit tenth lens L21 located on the most liquid crystal panel 18 side of the second lens unit LU2, and the second lens unit ninth lens L20 located adjacent to the second lens unit tenth lens L21 are each provided with positive power. Further, defining the refractive index on the d-line of the second lens unit tenth lens L21 as nd (23), and the Abbe number thereof as vd (23), the following conditional expression (6) and conditional expression (7) are satisfied.

$$1.75<nd(23)<2.00 \quad (6)$$

$$20<vd(23)<45 \quad (7)$$

Specifically, nd (23)=1.84666 vd (23)=23.78 are set.

Since the second lens unit ninth lens L20 and the second lens unit tenth lens L21 are each provide with positive power, and at the same time satisfy the conditional expression (6) and the conditional expression (7), in the projection optical system 3C, it is easy to correct the field curvature and the chromatic aberration.

Figure 13:
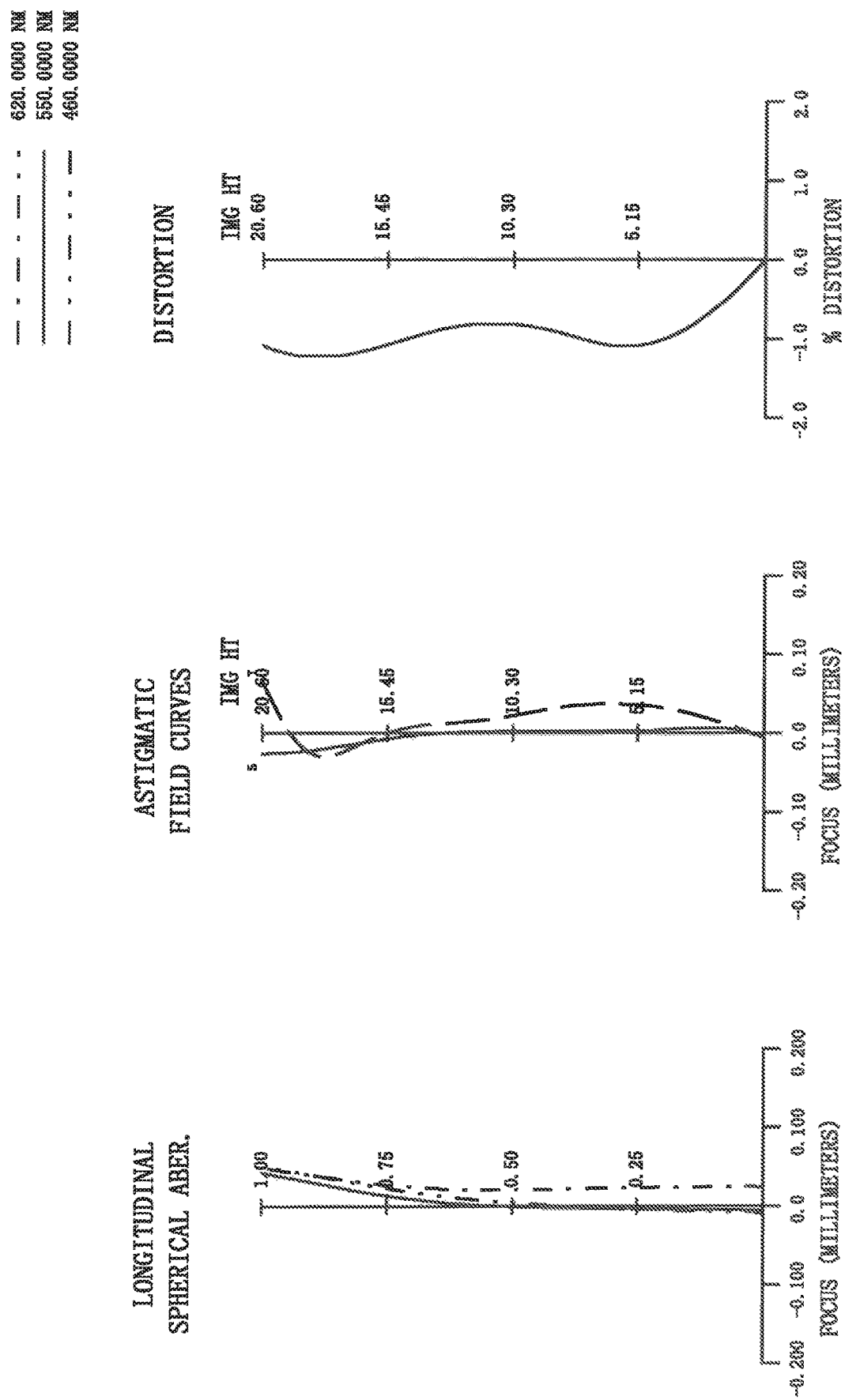
FIG. 13 is an aberration diagram of the projection optical system in the case in which the lenses are located at Position 1.
Figure 14:
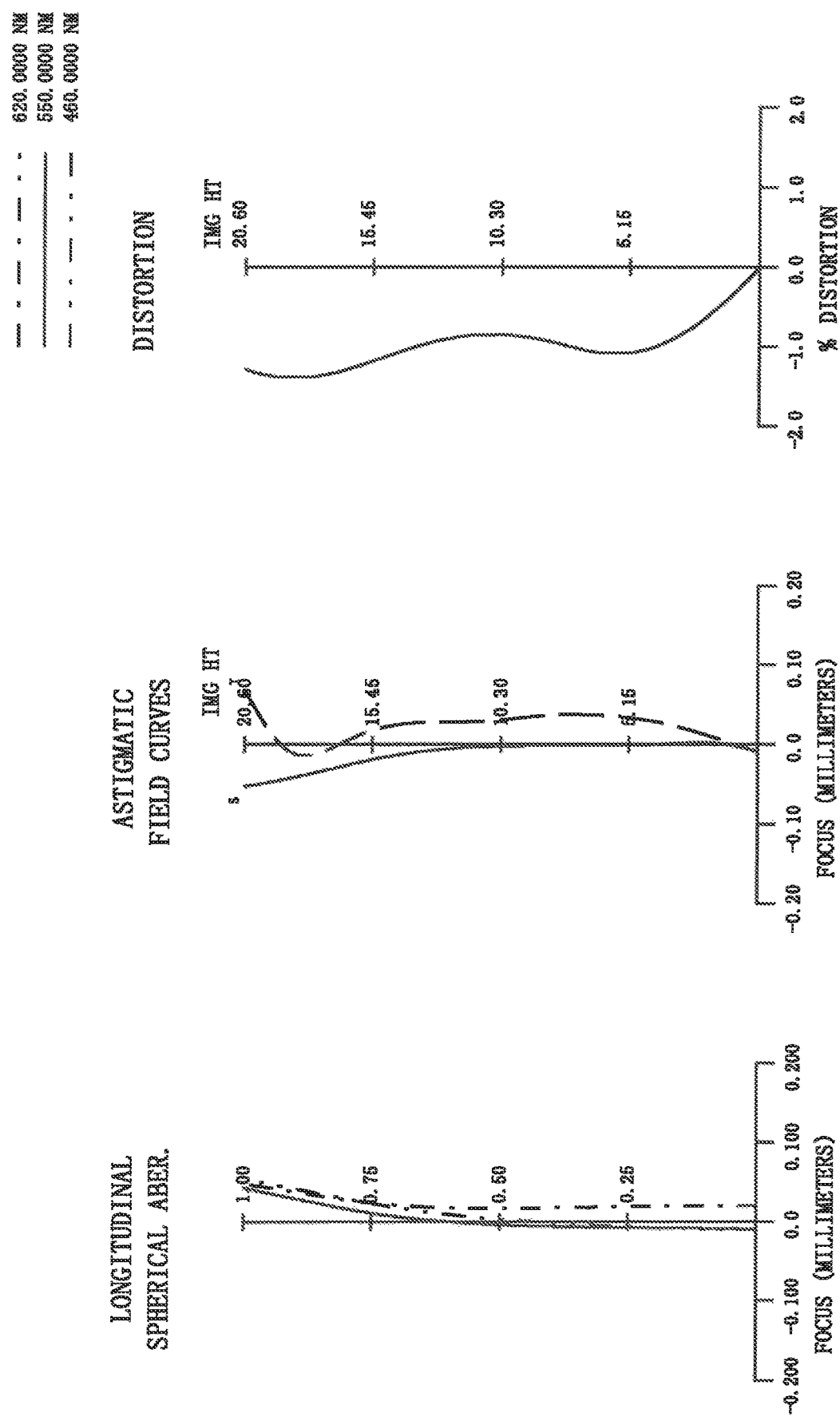
FIG. 14 is an aberration diagram of the projection optical system in the case in which the lenses are located at Position 2.
Figure 15:
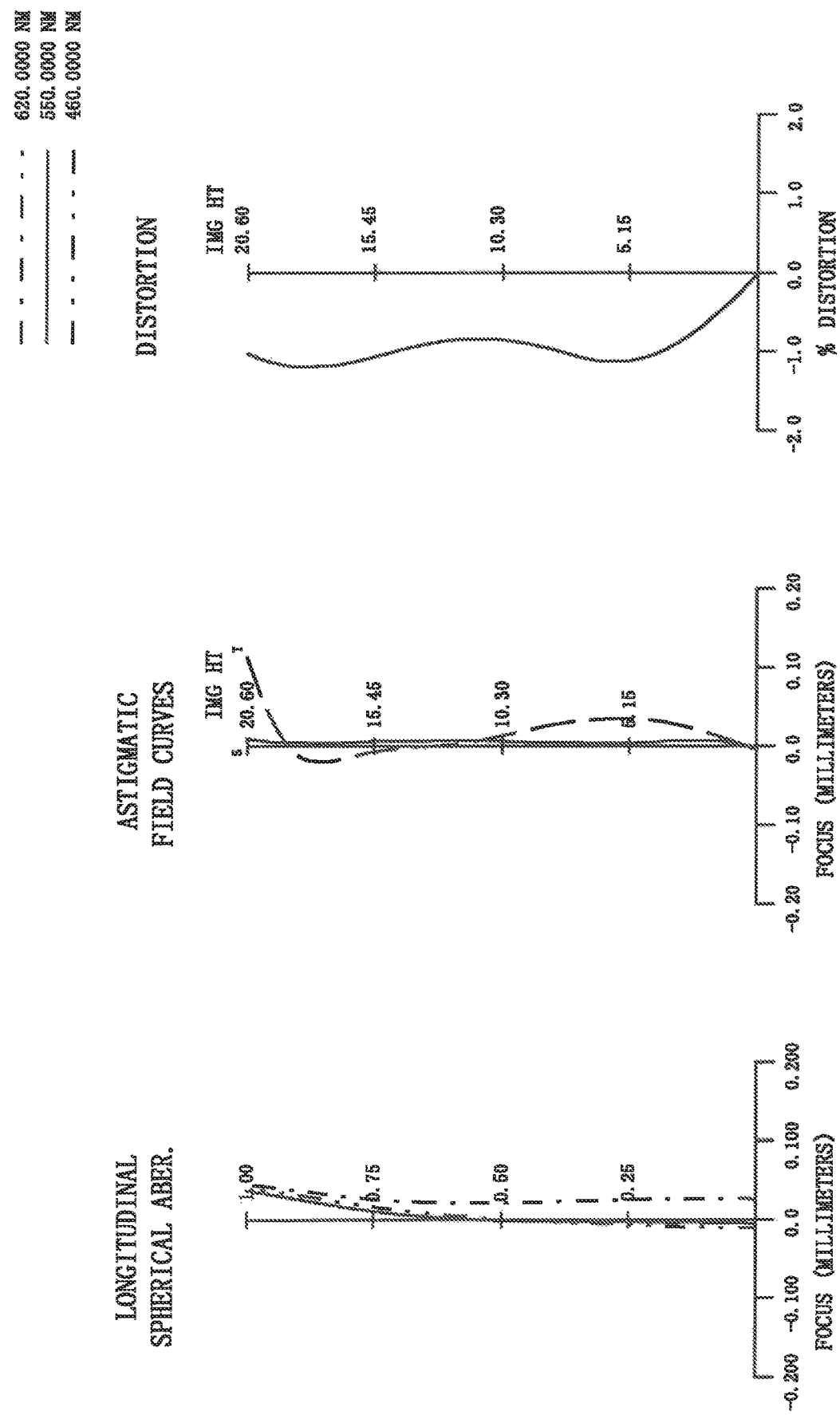
FIG. 15 is an aberration diagram of the projection optical system in the case in which the lenses are located at Position 3.

FIG. 13 is an aberration diagram (a spherical aberration, an astigmatism, and a distortion aberration) in the case in which the lenses of the projection optical system 3C are located at Position 1. FIG. 14 is an aberration diagram (a spherical aberration, an astigmatism, and a distortion aberration) in the case in which the lenses of the projection optical system 3C are located at Position 2. FIG. 15 is an aberration diagram (a spherical aberration, an astigmatism, and a distortion aberration) in the case in which the lenses of the projection optical system 3C are located at Position 3. As shown in FIG. 13 through FIG. 15, in the projection optical system 3C, the spherical aberration, the astigmatism, and the distortion aberration are corrected in good condition.

Figure 16:
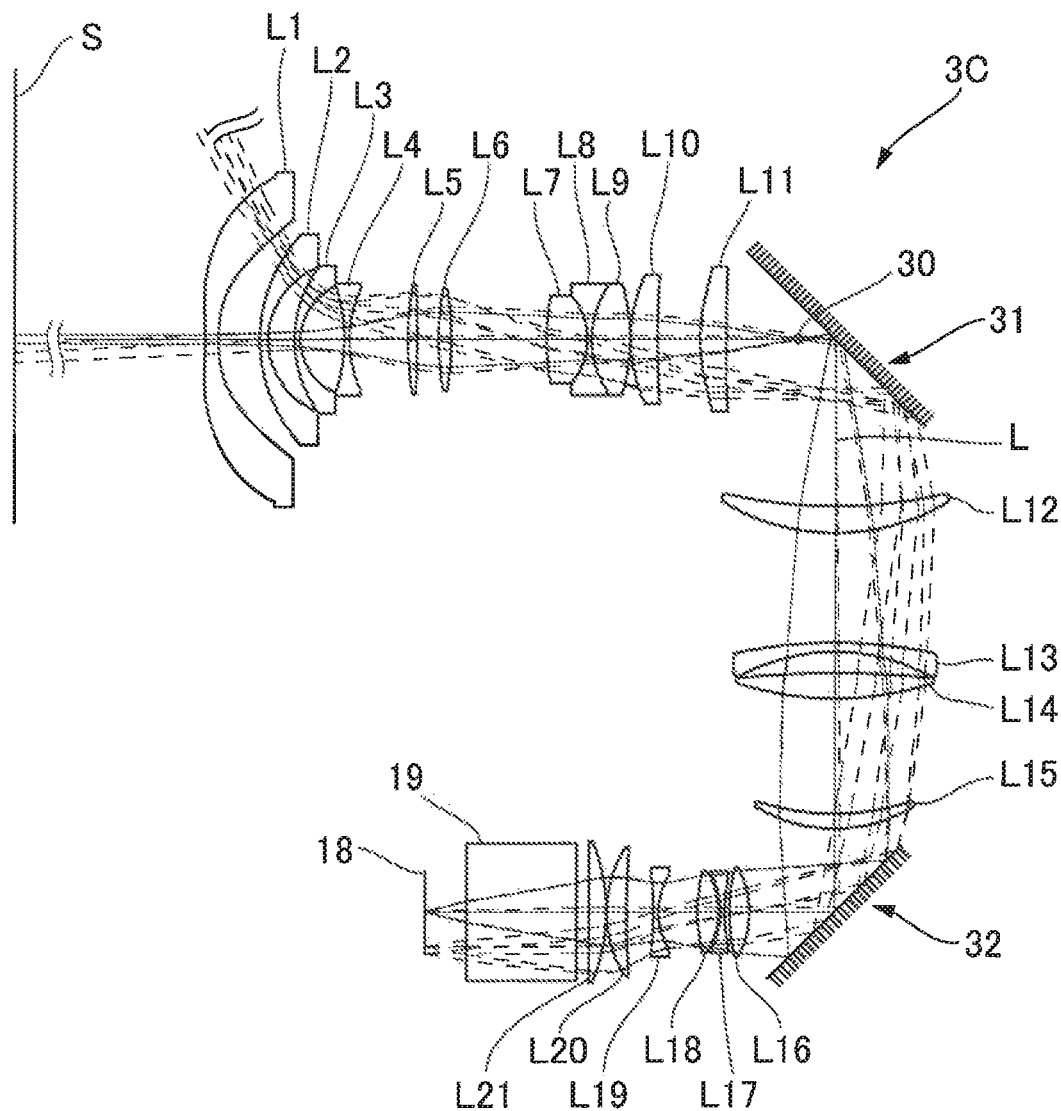
FIG. 16 is a configuration diagram in the case of folding the optical path of the projection optical system of Example 3.

Then, when incorporating the projection optical system 3C into the projector 1, a first mirror 31 (the first light path folding element) is disposed between the first lens unit LU1 and the second lens unit LU2 to fold the light path (the optical axis L) in between as shown in FIG. 16. Further, a second mirror 32 (the second light path folding element) is disposed between the second lens unit fourth lens L15 and the second lens unit fifth lens L16 in the second lens unit LU2 to fold the light path (the optical axis L) in between. If the first mirror 31 and the second mirror 32 are disposed in the projection optical system 3C, it is possible to orient the optical axis L to the desired direction. Therefore, it becomes easy to incorporate the projection optical system 3C into the projector 1.

Here, the distance between the second lens unit fourth lens L15 and the second lens unit fifth lens L16 is the longest in the on-axis surface distance between two lenses adjacent to each other in the second lens unit LU2. Therefore, it is easy to dispose the second mirror 32 between the second lens unit fourth lens L15 and the second lens unit fifth lens L16.

Further, in the present example, no mirror is disposed inside the first lens unit LU1. Therefore, it becomes easy to ensure the positional accuracy of each of the lenses of the first lens unit LU1 compared to the case of disposing the first mirror 31 inside the first lens unit LU1. Further, since the first mirror 31 is not disposed inside the first lens unit LU1, there is no need to provide a space for disposing the first mirror 31 inside the first lens unit LU1, and it is possible to prevent the total lens length LLU1 of the first lens unit LU1 from increasing. Here, the first lens unit LU1 is large in performance deterioration due to the position shift compared to the second lens unit LU2, and is required to be high in positional accuracy of the lenses. Therefore, by refraining from disposing the first mirror 31 in the first lens unit LU1, it is possible to suppress the variation in performance of the projection optical system 3C.

MODIFIED EXAMPLES

It should be noted that defining the three lenses formed of the first lens unit second lens L2, the first lens unit third lens L3, and the first lens unit fourth lens L4 as the first lens group LG1, the first lens unit fifth lens L5 as the second lens group LG2, and the first lens unit sixth lens L6 as a third lens group, in the case of changing the projection size on the screen S in the projection optical system 3C, it is also possible to perform focusing by moving the first lens group LG1, the second lens group LG2 and the third lens group in the state of fixing the first lens unit first lens L1. Here, the first lens group LG1 is provided with negative power, the second lens group LG2 is provided with positive power, and the third lens group is provided with positive power. Further, the first lens group LG1 has two or more lenses each provided with negative power. According also to such a configuration, it is possible to achieve focusing while preventing the aberration from occurring when the projection size has been changed.

Further, it is also possible to fold the light path (the optical axis L) using a prism instead of the mirrors 31, 32.

EXAMPLE 4

Figure 17:
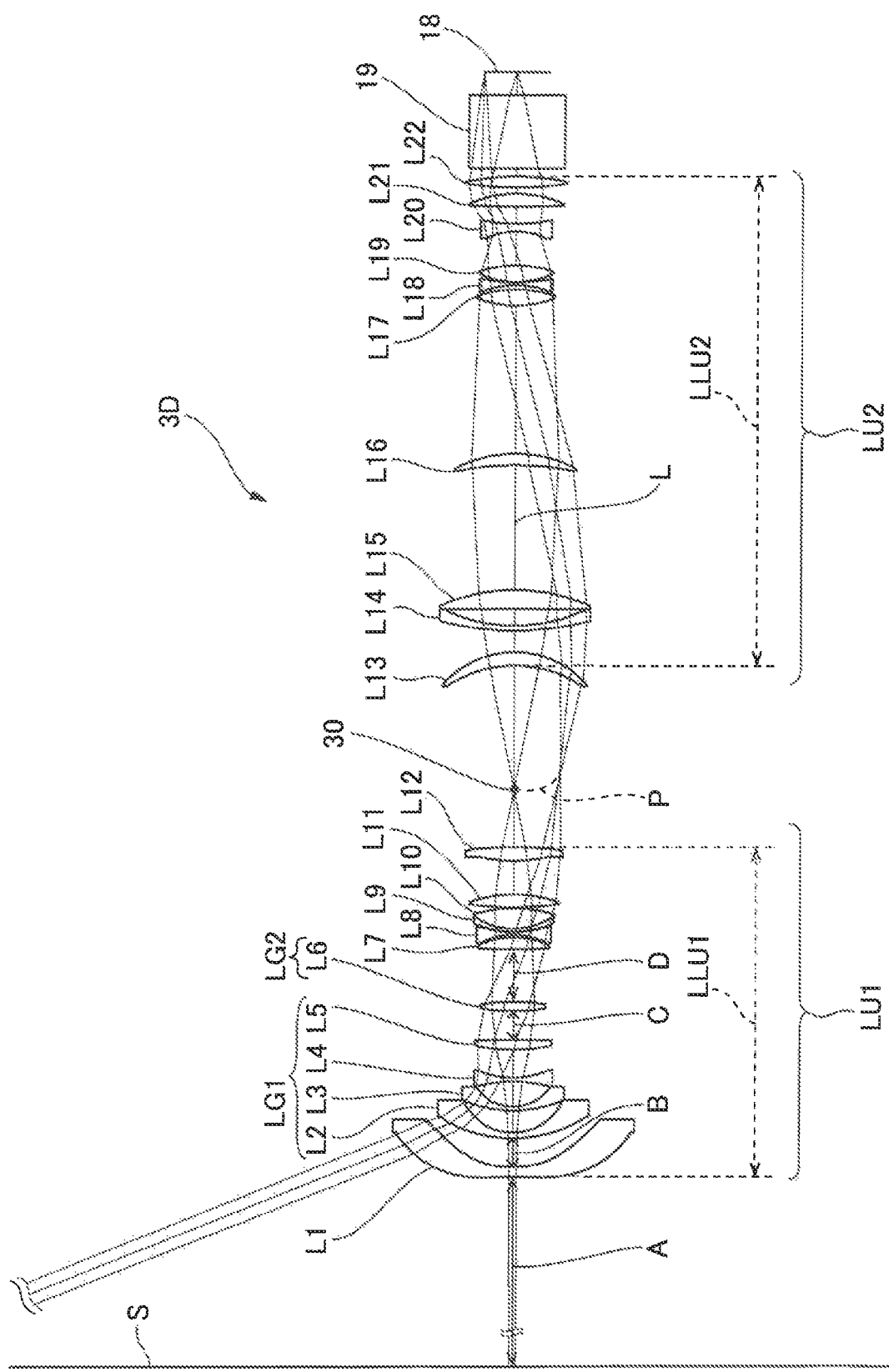
FIG. 17 is a configuration diagram of a projection optical system of Example 4.

FIG. 17 is a configuration diagram (ray chart) of the projection optical system of Example 4. As shown in FIG. 17, the projection optical system 3D of the present example is formed of a first lens unit LU1 for making the screen S as the enlargement-side imaging surface and the intermediate image 30 conjugate with each other, and a second lens unit LU2 for making the intermediate image 30 and the liquid crystal panel 18 (18R, 18G, and 18B) as the reduction-side imaging surface conjugate with each other. The first lens unit LU1 has positive power. The second lens unit LU2 has negative power.

The first lens unit LU1 is provided with a first lens unit first lens L1 (the first lens unit enlargement-side lens) provided with negative power, a first lens group LG1 provided with negative power, and a second lens group LG2 provided with positive power from the screen S side toward the intermediate image 30.

The first lens unit first lens L1 is an aspherical lens provided with aspherical shapes on the both surfaces.

The first lens group LG1 is provided with the two or more lenses each having negative power. In the present example, the first lens group LG1 is formed of four lenses, namely a first lens unit second lens L2, a first lens unit third lens L3, a first lens unit fourth lens L4, and a first lens unit fifth lens L5 from the screen S side toward the intermediate image 30. The first lens unit second lens L2 and the first lens unit third lens L3 are each provided with negative power, and at the same time each provided with a convex meniscus shape on the screen S side. The first lens unit fourth lens L4 is provided with negative power, and at the same time is provided with concave surfaces on the screen S side and the intermediate image 30 side, respectively. The first lens unit fifth lens L5 is provided with positive power, and is provided with convex surfaces on the screen S side and the intermediate image 30 side, respectively.

The second lens group LG2 is formed of a single lens. A first lens unit sixth lens L6 constituting the second lens group LG2 is provided with positive power. Further, the first lens unit sixth lens L6 is provided with convex surfaces on the screen S side and the intermediate image 30 side, respectively.

Further, the first lens unit LU1 is provided with a first lens unit seventh lens L7, a first lens unit eighth lens L8, a first lens unit ninth lens L9, a first lens unit tenth lens L10, a first lens unit eleventh lens L11, and a first lens unit twelfth lens L12 from the second lens group LG2 toward the intermediate image 30. Therefore, the first lens unit LU1 is formed of the 12 lenses. The first lens unit ninth lens L9 and the first lens unit tenth lens L10 constitute a cemented lens. In the present example, the first lens unit twelfth lens L12 (a first lens unit intermediate image-side lens) is an aspherical lens provided with aspherical shapes on the both surfaces.

The second lens unit LU2 is provided with a second lens unit first lens L13, a second lens unit second lens L14, a second lens unit third lens L15, a second lens unit fourth lens L16, a second lens unit fifth lens L17, a second lens unit sixth lens L18, a second lens unit seventh lens L19, a second lens unit eighth lens L20, a second lens unit ninth lens L21, and a second lens unit tenth lens L22 from the intermediate image 30 side toward the liquid crystal panel 18. Therefore, the second lens unit LU2 is formed of the 10 lenses. Between the second lens unit tenth lens L22 and the liquid crystal panel 18, there is disposed a cross dichroic prism 19.

The second lens unit first lens L13 (the second lens unit intermediate image-side first lens) has positive power. The second lens unit first lens L13 has a meniscus shape provided with a concave surface on the intermediate image 30 side, and a convex surface on the liquid crystal panel 18 side. The second lens unit second lens L14 (the second lens unit intermediate image-side second lens) has negative power. The second lens unit second lens L14 has a meniscus shape provided with a convex surface on the intermediate image 30 side, and a concave surface on the liquid crystal panel 18 side. The second lens unit third lens L15 (the second lens unit intermediate image-side third lens) has positive power. The second lens unit third lens L15 is provided with a convex surface on the liquid crystal panel 18 side. The second lens unit fourth lens L16 has negative power. The second lens unit fourth lens L16 has a meniscus shape provided with a concave surface on the intermediate image 30 side, and a convex surface on the liquid crystal panel 18 side.

The second lens unit tenth lens L22 (the second lens unit reduction-side first lens) the closest to the liquid crystal panel 18 in the second lens unit LU2, and the second lens unit ninth lens L21 (the second lens unit reduction-side second lens) located adjacent to the second lens unit tenth lens L22 are each provided with positive power. The second lens unit ninth lens L21 is provided with a convex surface on the liquid crystal panel 18 side. The second lens unit tenth lens L22 is provided with convex surfaces on the intermediate image 30 side, and the liquid crystal panel 18 side, respectively.

In the projection optical system 3D, as shown in FIG. 17, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12. The focusing position P of the off-axis light in the intermediate image 30 comes closer to the second lens unit first lens L13 as proceeding toward the off-axis direction.

In the case of changing the projection size on the screen S in the projection optical system 3D, the first lens group LG1 and the second lens group LG2 (the first lens unit sixth lens L6) are moved in the optical axis L direction to achieve focusing in the state of fixing the first lens unit first lens L1.

Here, defining the focal distance of the projection optical system 3D as |f|, the maximum field angle (half field angle) as ω, the F-number as FNo, an effective image circle diameter as φ, an air-conversion value of the back focus as BF, the total lens length of the first lens unit LU1 as LLU1, and the total lens length of the second lens unit LU2 as LLU2, the data of the projection optical system 3D of Example 4 is as follows. It should be noted that the total lens length LLU1 is the distance from the surface on the screen S side of the first lens unit first lens L1 to the surface on the intermediate image 30 side of the first lens unit twelfth lens L12 on the optical axis L. The total lens length LLU2 is the distance from the surface on the intermediate image 30 side of the second lens unit first lens L13 to the surface on the liquid crystal panel 18 side of the second lens unit tenth lens L22 on the optical axis L.

|f|=7.88 mm
ω=67.8°
FNo=1.73
φ=41.2 mm
BF=48.786 mm
LLU1=203.015 mm
LLU2=300.923 mm

Further, the lens data of the projection optical system 3D is as follows. The column of the lens shows the reference symbols attached to the respective lenses shown in FIG. 17. The surfaces having the surface number attached with "*" are aspherical surfaces. The reference symbol R represents a curvature radius. The reference symbol d represents an on-axis surface distance (mm) (lens thickness or a lens distance). The reference symbol nd represents a refractive index. The reference symbol vd represents an Abbe number. It should be noted that the on-axis surface distance A is the distance between the screen S and the first lens unit first lens L1. The on-axis surface distance B is the distance between the first lens unit first lens L1 and the first lens group LG1. The on-axis surface distance C is the distance between the first lens group LG1 and the second lens group LG2 (the first lens unit sixth lens L6). The on-axis surface distance D is the distance between the second lens group LG2 (the first lens unit sixth lens L6) and the first lens unit seventh lens L7. The on-axis surface distance A varies with the projection size, and the on-axis surface distances B, C, and D change due to focusing in the case in which the projection size has been changed.

| LENS | SURFACE NUMBER | R | d | nd | vd |
|---|---|---|---|---|---|
| S |  | INFINITY | A |  |  |
| L1 | *1 | −98.129 | 6 | 1.50942 | 55.88 |
|  | *2 | 97.124 | B |  |  |
| L2 | 3 | 80.2055 | 3.5 | 1.744 | 44.78 |
|  | 4 | 32.218 | 13.486 |  |  |
| L3 | 5 | 71.57 | 2.58 | 1.7859 | 44.2 |
|  | 6 | 26.452 | 15.371 |  |  |
| L4 | 7 | −82.208 | 2.38 | 1.497 | 81.54 |
|  | 8 | 51.1925 | 17.196 |  |  |
| L5 | 9 | 99.0511 | 6.32 | 1.84666 | 23.78 |
|  | 10 | −511.862 | C |  |  |
| L6 | 11 | 124.794 | 5.55 | 1.8061 | 33.27 |
|  | 12 | −129.006 | D |  |  |
| L7 | 13 | 271.395 | 7.56 | 1.744 | 44.78 |
|  | 14 | −46.7167 | 1.569 |  |  |
| L8 | 15 | −40.767 | 1.6 | 1.84666 | 23.78 |
|  | 16 | 66.178 | 0.2 |  |  |
| L9 | 17 | 56.493 | 1.81 | 1.80518 | 25.46 |
| L10 | 18 | 40.6499 | 12.684 | 1.48749 | 70.23 |
|  | 19 | −76.648 | 0.39 |  |  |
| L11 | 20 | 175.465 | 8.03 | 1.497 | 81.54 |
|  | 21 | −76.028 | 20.7 |  |  |
| L12 | *22 | 81.542 | 8.45 | 1.50942 | 55.88 |
|  | *23 | −196.44 | 111.98 |  |  |
| L13 | 24 | −71.227 | 8.19 | 1.61772 | 49.81 |
|  | 25 | −57.0399 | 13.436 |  |  |
| L14 | 26 | 171.009 | 3.2 | 1.72047 | 34.71 |
|  | 27 | 96.659 | 10.42 |  |  |
| L15 | 28 | −2853.038 | 11.54 | 1.8061 | 33.27 |
|  | 29 | −109.125 | 77 |  |  |
| L16 | 30 | −158.499 | 7 | 1.48749 | 70.23 |
|  | 31 | −75.857 | 90.73 |  |  |
| L17 | 32 | 58.409 | 9.87 | 1.497 | 81.54 |
|  | 33 | −77.195 | 2.637 |  |  |
| L18 | 34 | −59.131 | 1.8 | 1.84666 | 23.78 |
|  | 35 | 107.222 | 0.2 |  |  |
| L19 | 36 | 49.527 | 10.18 | 1.497 | 81.54 |
|  | 37 | −69.515 | 20.97 |  |  |
| L20 | 38 | −39.258 | 4.5 | 1.72825 | 28.46 |
|  | 39 | 87.301 | 10.84 |  |  |
| L21 | 40 | 688.428 | 7.95 | 1.92286 | 20.88 |
|  | 41 | −66.384 | 3.64 |  |  |
| L22 | 42 | 180.439 | 6.82 | 1.92286 | 20.86 |
|  | 43 | −144.579 | 5 |  |  |
| (19) | 44 | INFINITY | 45 | 1.5168 | 64.2 |
|  | 45 | INFINITY | 14.12 |  |  |

The coefficients of the odd-order aspheric expression for defining the aspherical shape of each of the surfaces (of the first lens unit first lens L1) with the surface numbers 1, 2 formed as the aspherical surfaces are as follows.

|  | SURFACE NUMBER | |
|---|---|---|
|  | 1 | 2 |
| Y CURVATURE RADIUS | −98.129 | 97.124 |
| CONIC CONSTANT | −36.951 | 1.195 |
| 3rd-ORDER ASPHERIC COEFFICIENT | 1.40330E−04 | 1.7042E−04 |
| 4th-ORDER ASPHERIC COEFFICIENT | 1.13940E−06 | 4.4611E−07 |
| 5th-ORDER ASPHERIC COEFFICIENT | −7.72380E−08 | −3.3800E−08 |
| 6th-ORDER ASPHERIC COEFFICIENT | 6.37540E−10 | −3.6500E−10 |
| 7th-ORDER ASPHERIC COEFFICIENT | 1.02680E−11 | 1.3558E−13 |
| 8th-ORDER ASPHERIC COEFFICIENT | −1.16660E−13 | −1.2520E−14 |
| 9th-ORDER ASPHERIC COEFFICIENT | −6.31820E−16 | 2.7759E−15 |
| 10th-ORDER ASPHERIC COEFFICIENT | 2.83160E−18 | −2.0421E−17 |
| 11th-ORDER ASPHERIC COEFFICIENT | 2.35510E−20 | 5.6647E−19 |
| 12th-ORDER ASPHERIC COEFFICIENT | −5.04360E−22 | −1.3463E−20 |
| 13th-ORDER ASPHERIC COEFFICIENT | 2.65770E−23 | −1.5068E−22 |
| 14th-ORDER ASPHERIC COEFFICIENT | 3.25050E−25 | 2.8023E−24 |
| 15th-ORDER ASPHERIC COEFFICIENT | −5.66020E−27 | 1.0900E−25 |
| 16th-ORDER ASPHERIC COEFFICIENT | −8.55340E−30 | −8.8219E−28 |
| 17th-ORDER ASPHERIC COEFFICIENT | −9.13480E−31 | −2.3294E−29 |
| 18th-ORDER ASPHERIC COEFFICIENT | 1.27390E−32 | −2.2166E−31 |
| 19th-ORDER ASPHERIC COEFFICIENT |  | 6.4588E−33 |

Further, the coefficients of the even-order aspheric expression for defining the aspherical shape of each of the surfaces (of the first lens unit twelfth lens L12) with the surface numbers 22, 23 formed as the aspherical surfaces are as follows.

|  | SURFACE NUMBER | |
| --- | --- | --- |
|  | 19 | 20 |
| Y CURVATURE RADIUS | 81.542 | −196.440 |
| CONIC CONSTANT (K) | 4.353 | 21.752 |
| 4th-ORDER COEFFICIENT (A) | 1.81220E−07 | 7.51940E−06 |
| 6th-ORDER COEFFICIENT (B) | −8.41140E−09 | −1.21140E−08 |
| 8th-ORDER COEFFICIENT (C) | −7.57770E−13 | 7.64500E−13 |
| 10th-ORDER COEFFICIENT (D) | 2.90690E−16 | 4.32840E−15 |
| 12th-ORDER COEFFICIENT (E) | 7.44910E−19 | −3.68880E−21 |
| 14th-ORDER COEFFICIENT (F) | 1.51470E−21 | −3.98230E−23 |
| 16th-ORDER COEFFICIENT (G) | 2.21420E−24 | 2.40420E−26 |
| 18th-ORDER COEFFICIENT (H) | 2.47400E−27 | 1.03450E−27 |
| 20th-ORDER COEFFICIENT (J) | −3.81380E−30 | 0.00000E+00 |

Then, the on-axis surface distances A, B, C, and D (unit: mm), the focal distance |f| (unit: mm), and the half field angle ω (unit: °) in the case of changing the projection size and then performing focusing are as follows. It should be noted that a set of the positions of the lenses after achieving focusing in the case of setting the on-axis surface distance A, which is the distance between the first lens unit first lens and the screen S, to 1200 mm is defined as Position 1, a set of the positions of the lenses in the case of setting the on-axis surface distance A to 800 mm is defined as Position 2, and a set of the positions of the lenses in the case of setting the on-axis surface distance A to 3000 mm is defined as Position 3.

|  | POSITION 1 | POSITION 2 | POSITION 3 |
| --- | --- | --- | --- |
| A | 1200 | 800 | 3000 |
| B | 17.71 | 17.995 | 17.295 |
| C | 17.844 | 17.979 | 17.667 |
| D | 32.085 | 31.665 | 32.677 |
| |f| | 7.88 | 7.85 | 7.93 |
| ω | 67.8 | 67.7 | 67.9 |

According to the projection optical system 3D of the present example, since the second lens unit first lens L13 has positive power, it is easy to form the intermediate image 30 on the first lens unit LU1 side of the second lens unit first lens L13. Further, since the intermediate image 30 is formed using the lens having positive power, it is easy for the second lens unit LU2 to correct the distortion aberration occurring in the first lens unit LU1.

Further, a principal beam of an off-axis light beam passing between the first lens unit twelfth lens L12 and the second lens unit first lens L13 respectively located on the both sides across the intermediate image 30 comes closer to the optical axis L as proceeding from the second lens unit first lens L13 toward the first lens unit twelfth lens L12, and the focusing position P of the off-axis light in the intermediate image 30 comes closer to the second lens unit first lens L13 as proceeding toward the off-axis direction. Thus, it is easy for the second lens unit LU2 to correct the distortion aberration occurring in the first lens unit LU1, and it is possible to suppress the burden of correcting the aberration by the first lens unit LU1.

Further, in the present example, since the first lens unit first lens L1 and the first lens unit twelfth lens L12 are the aspherical lenses, it is easy to correct the distortion aberration in the first lens unit first lens L1, and it becomes easy to correct the field curvature in the first lens unit twelfth lens L12. Further, since the first lens unit first lens L1 is the aspherical lens, it is easy to reduce the diameter of the first lens unit first lens L1.

Here, the projection optical system 3D satisfies the following conditional expression (1) defining the focal distance of the first lens unit LU1 as fU1, and the focal distance of the second lens unit LU2 as fU2.

$$-0.3 < fU1/fU2 < -0.005 \quad (1)$$

Specifically,
fU1=11.73
fU2=−333.4
and, therefore
fU1/fU2=−0.035
is obtained.

Since the projection optical system 3D of the present example satisfies the conditional expression (1), it is easy to prevent the distortion from occurring in the projection field while preventing the number of lenses from increasing to thereby make the maximum field angle as wide angle as no smaller than 120° (make the half field angle ω no smaller than 60°). That is, if the value of the conditional expression (1) exceeds the lower limit, the focal distance of the first lens unit LU1 becomes too long to easily make the field angle wide angle. Further, if the value of the conditional expression (1) exceeds the lower limit, the tilt of the light beam between the second lens unit LU2 and the intermediate image 30 with respect to the optical axis L becomes large to incur the deterioration of the field curvature, and at the same time, the diameter of the lens (the second lens unit first lens L13) located on the most intermediate image 30 side of the second lens unit LU2 becomes large. In contrast, if the value of the conditional expression (1) exceeds the upper limit, the light beam entering the first lens unit LU1 from the intermediate image 30 side becomes a roughly telecentric light beam or a light beam with the beam diameter increasing. Thus, the load on the first lens unit LU1 increases, and therefore, it is necessary to increase the number of lenses of the first lens unit LU1 in order to correct the aberration.

Further, in the present example, the total lens length LLU1 of the first lens unit LU1 and the total lens length LLU2 of the second lens unit LU2 satisfy the following conditional expression (2).

$$0.5 < LLU1/LLU2 < 0.9 \quad (2)$$

Specifically,
LLU1/LLU2=203.015/300.923=0.67
is obtained,

Therefore, according to the present example, it is easy to make the total lens length LLU1 of the first lens unit LU1 shorter than the total lens length LLU2 of the second lens unit LU2, and thus make the whole of the projection optical system 3D compact.

Further, in the present example, the second lens unit first lens L13 is provided with positive power, the second lens unit second lens L14 is provided with negative power, and the second lens unit third lens L15 is provided with positive power. Further, the second lens unit first lens L13 is provided with a concave surface on the intermediate image 30 side, and the second lens unit second lens L14 is provided with the concave surface on the liquid crystal panel 18 side. In addition thereto, defining the refractive index on the d-line of the second lens unit first lens L13 as nd (21), and the Abbe number as vd (21), the refractive index on the d-line of the second lens unit second lens L14 as nd (22), and the Abbe number as vd (22), the following conditional expression (3) and conditional expression (4) are satisfied.

$$|nd(22)-nd(21)|<0.4 \quad (3)$$

$$|vd(21)-vd(22)|<30 \quad (4)$$

Specifically,
|nd (22)−nd (21)|=|1.72047−1.61772|=0.10
and,
|vd (21)−vd (22)|=49.81−34.71=15.10
are obtained.

Since the second lens unit first lens L13, the second lens unit second lens L14, and the second lens unit third lens L15 are provided with the configuration described above, and satisfy the conditional expression (3) and the conditional expression (4), it is possible for the projection optical system 3D to make the aberration occurring at a position high in image height in the second lens unit LU2 appropriate. Thus, it becomes easy for the first lens unit LU1 to correct the aberration occurring in the second lens unit LU2.

Further, in the present example, defining the focal distance on the d-line as f, and the air-conversion value of the overall back focus as BF, the following conditional expression (5) is satisfied.

$$BF/|f|>5 \quad (5)$$

Specifically,
BF/|f|=48.786/7.88=6.2
is obtained.

Since the conditional expression (5) is satisfied, in the projection optical system 3D, a relatively long back focus can be ensured, and it is easy to make the maximum field angle as wide angle as no smaller than 120°.

Further, in the present example, the second lens unit tenth lens L22 located on the most liquid crystal panel 18 side of the second lens unit LU2, and the second lens unit ninth lens L21 located adjacent to the second lens unit tenth lens L22 are each provided with positive power. Further, defining the refractive index on the d-line of the second lens unit tenth lens L22 as nd (23), and the Abbe number thereof as vd (23), the following conditional expression (6) and conditional expression (7) are satisfied.

$$1.75<nd(23)<2.00 \quad (6)$$

$$20<vd(23)<45 \quad (7)$$

Specifically,
nd (23)=1.92286
vd (23)=20.86
are set.

Since the second lens unit ninth lens L21 and the second lens unit tenth lens L22 are each provided with positive power, and at be same time satisfy the conditional expression (6) and the conditional expression (7), in the projection optical system 3D, it is easy to correct the field curvature and the chromatic aberration.

Figure 18:
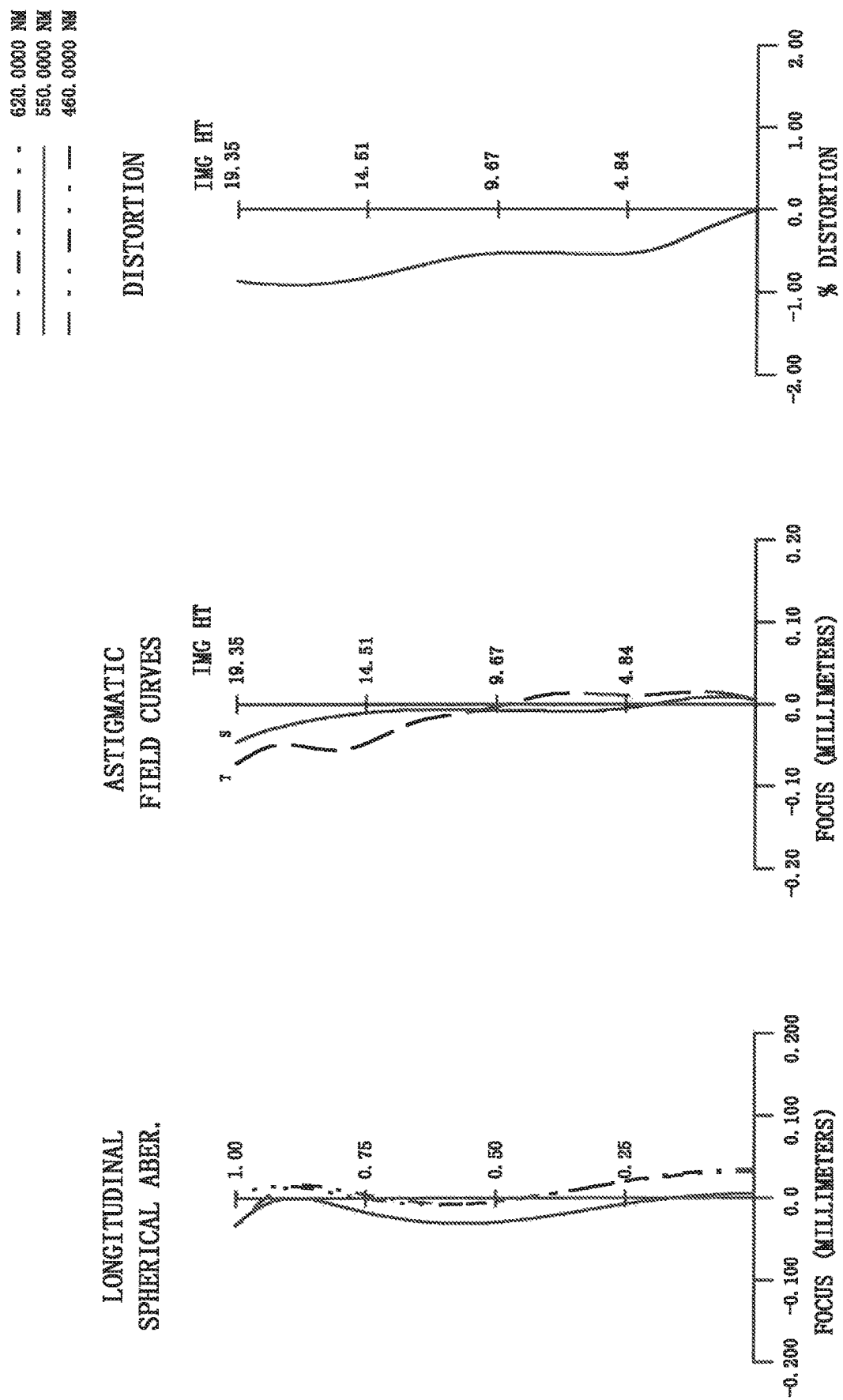
FIG. 18 is an aberration diagram of the projection optical system in the case in which the lenses are located at Position 1.
Figure 19:
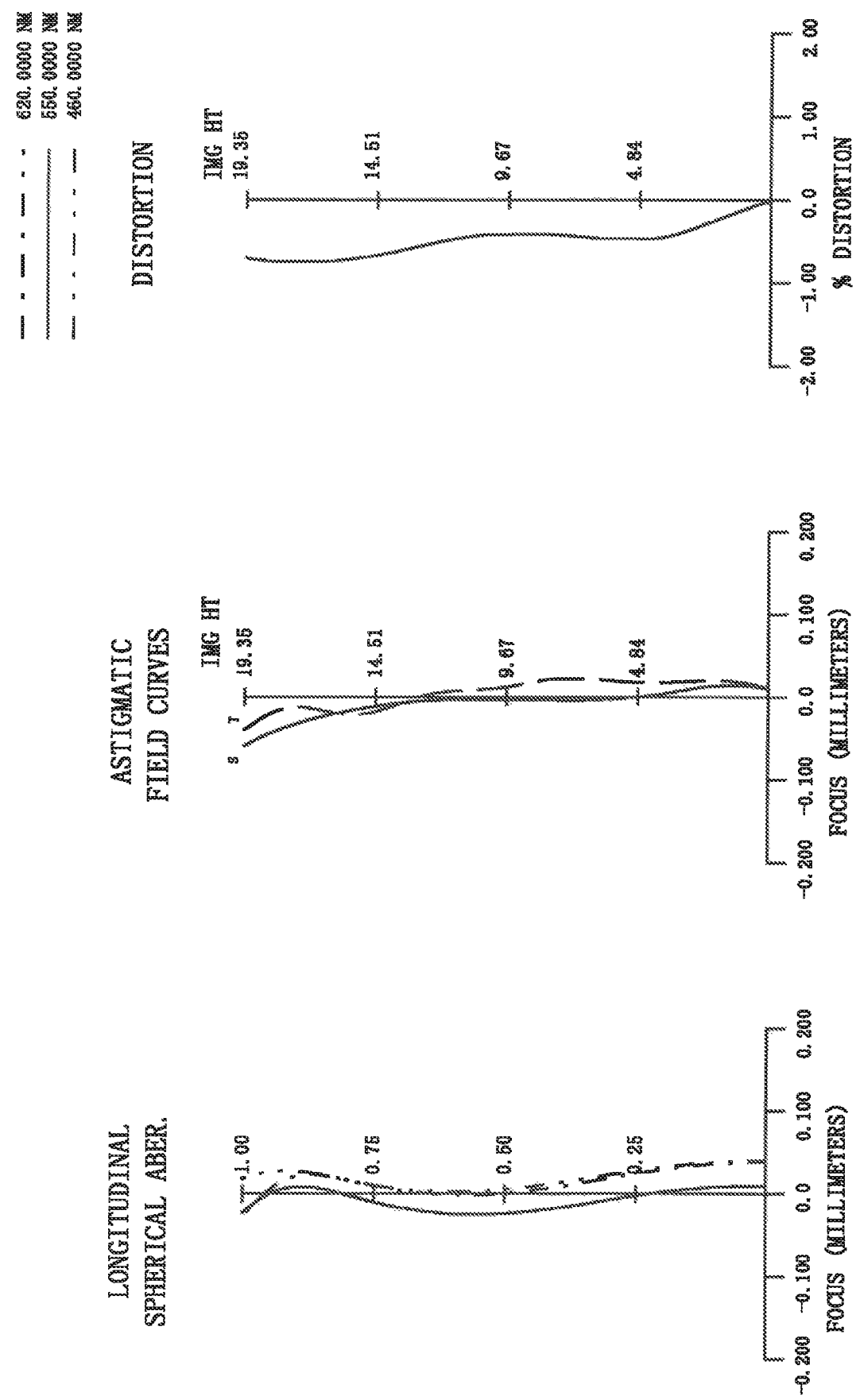
FIG. 19 is an aberration diagram of the projection optical system in the case in which the lenses are located at Position 2.
Figure 20:
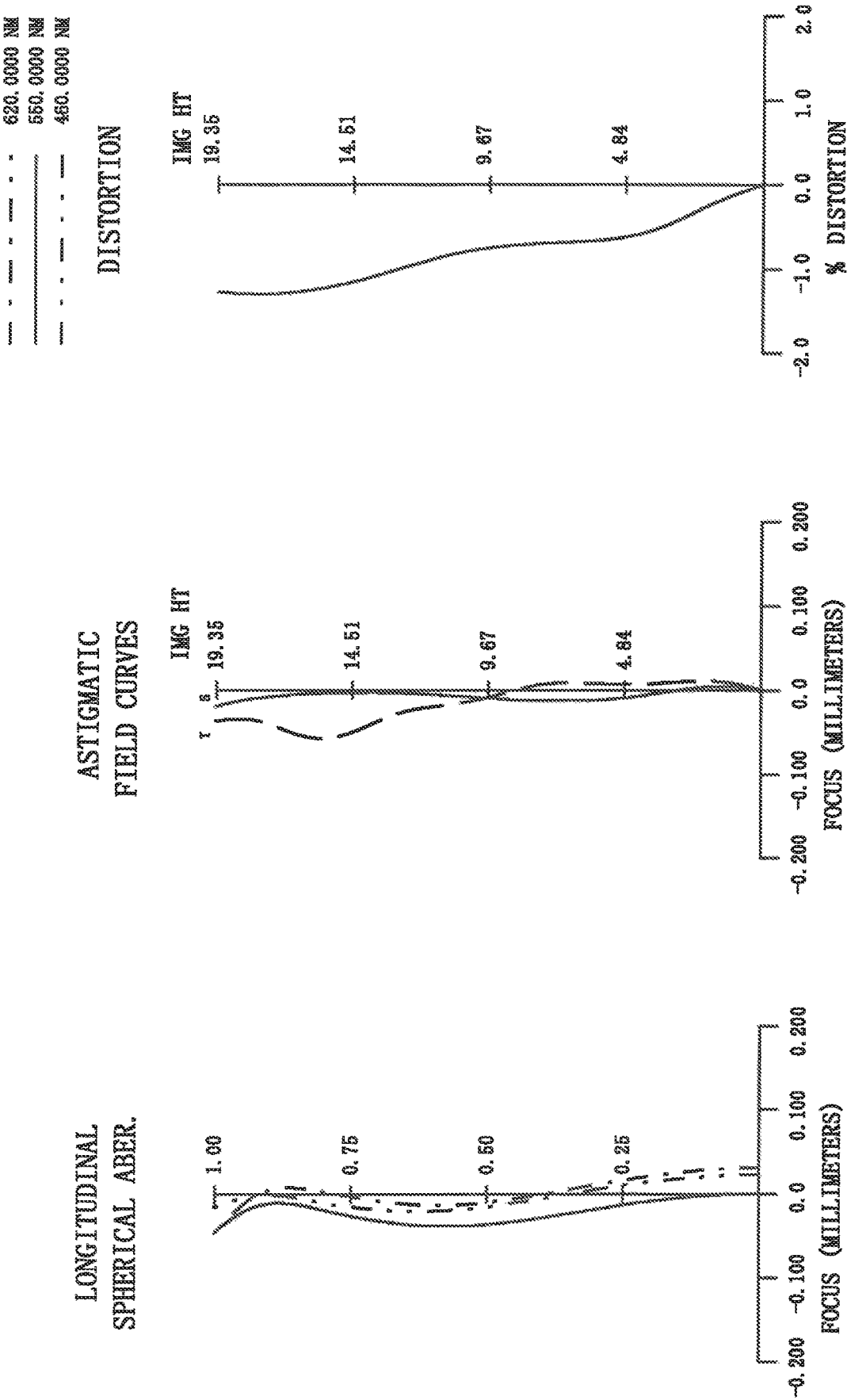
FIG. 20 is an aberration diagram of the projection optical system in the case in which the lenses are located at Position 3.

FIG. 18 is an aberration diagram (a spherical aberration, an astigmatism, and a distortion aberration) in the case in which the lenses of the projection optical system 3D are located at Position 1. FIG. 19 is an aberration diagram (a spherical aberration, an astigmatism, and a distortion aberration) in the case in which the lenses of the projection optical system 3D are located at Position 2. FIG. 20 is an aberration diagram (a spherical aberration, an astigmatism, and a distortion aberration) in the case in which the lenses of the projection optical system 3D are located at Position 3. As shown in FIG. 18 through FIG. 20, in the projection optical system 3D, the spherical aberration, the astigmatism, and the distortion aberration are corrected in good condition.

Figure 21:
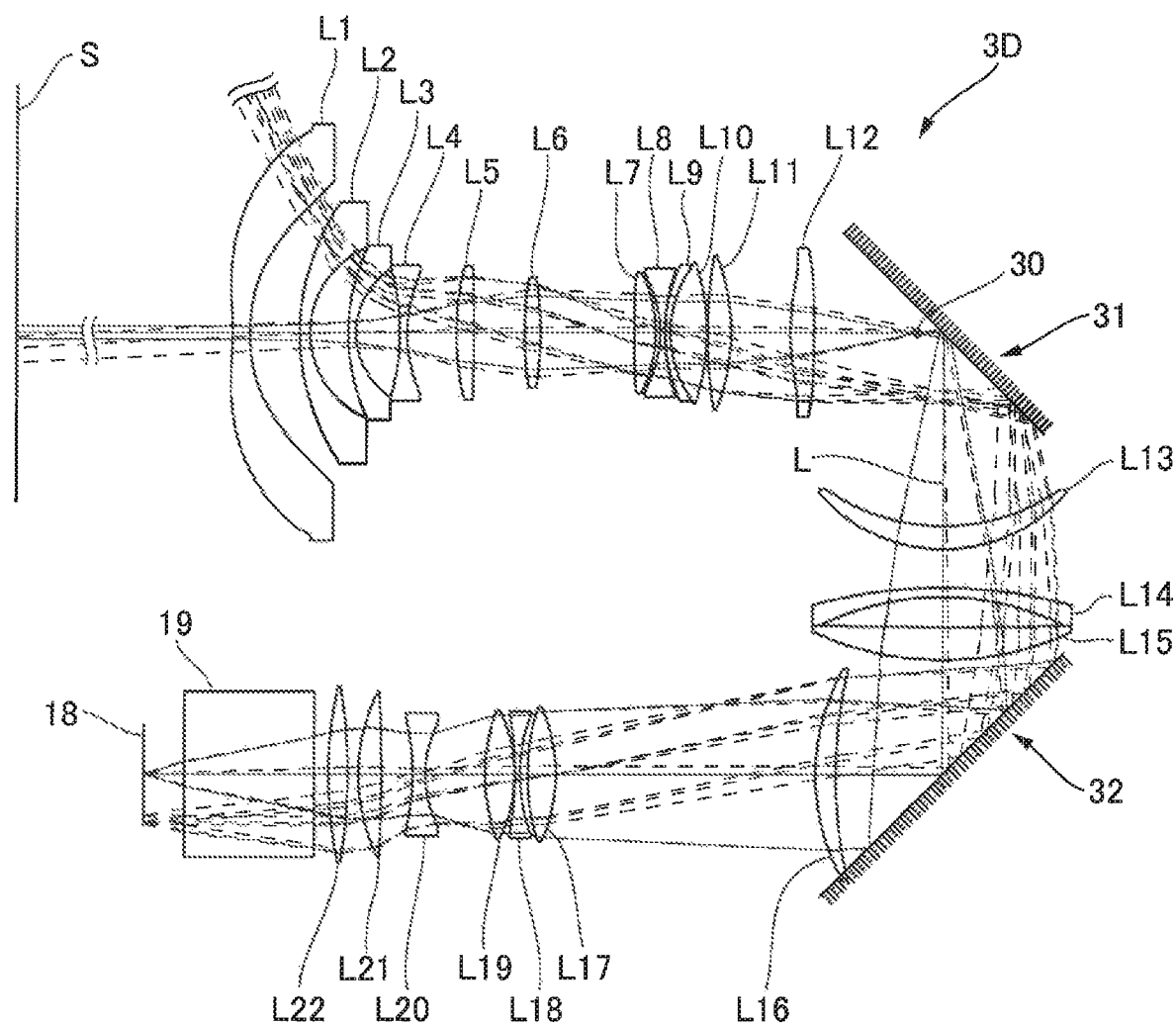
FIG. 21 is a configuration diagram in the case of folding the optical path of the projection optical system of Example 4.

Then, when incorporating the projection optical system 3D into the projector 1, a first mirror 31 (the first light path folding element) is disposed between the first lens unit LU1 and the second lens unit LU2 to fold the light path (the optical axis L) in between as shown in FIG. 21. Further, a second mirror 32 (the second light path folding element) is disposed between the second lens unit third lens L15 and the second lens unit fourth lens L16 in the second lens unit LU2 to fold the light path (the optical axis L) in between. If the first mirror 31 and the second mirror 32 are disposed in the projection optical system 3D, it is possible to orient the optical axis L to the desired direction. Therefore, it becomes easy to incorporate the projection optical system 3D into the projector 1.

Here, the distance between the second lens unit third lens L15 and the second lens unit fourth lens L16 is the next longest to the on-axis surface distance between the second lens unit fourth lens L16 and the second lens unit fifth lens L17 in the on-axis surface distance between two lenses adjacent to each other in the second lens unit LU2. Therefore, it is easy to dispose the second mirror 32 between the second lens unit third lens L15 and the second lens unit fourth lens L16.

Further, in the present example, no mirror is disposed inside the first lens unit LU1. Therefore, it becomes easy to ensure the positional accuracy of each of the lenses of the first lens unit LU1 compared to the case of disposing the first mirror 31 inside the first lens unit LU1. Further, since the first mirror 31 is not disposed inside the first lens unit LU1, there is no need to provide a space for disposing the first mirror 31 inside the first lens unit LU1, and it is possible to prevent the total lens length LLU1 of the first lens unit LU1 from increasing. Here, the first lens unit LU1 is large in performance deterioration due to the position shift compared to the second lens unit LU2, and is required to be high in positional accuracy of the lenses. Therefore, by refraining from disposing the first mirror 31 in the first lens unit LU1, it is possible to suppress the variation in performance of the projection optical system 3D.

MODIFIED EXAMPLES

It should be noted that defining the three lenses formed of the first lens unit second lens L2, the first lens unit third lens L3, and the first lens, unit fourth lens L4 as the first lens group LG1, the first lens unit fifth lens L5 as the second lens group LG2, and the first lens unit sixth lens L6 as a third lens group, in the case of changing the projection size on the screen S in the projection optical system 3D, it is also possible to perform focusing by moving the first lens group LG1, the second lens group LG2 and the third lens group in the state of fixing the first lens unit first lens L1. Here, the first lens group LG1 is provided with negative power, the second lens group LG2 is provided with positive power, and the third lens group is provided with positive power. Further, the first lens group LG1 has two or more lenses each provided with negative power. According also to such a configuration, it is possible to achieve focusing while preventing the aberration from occurring when the projection size has been changed.

Further, it is also possible to fold the light path (the optical axis L) using a prism instead of the mirrors 31, 32.

The entire disclosure of Japanese Patent Application No. 2016-239108, filed Dec. 9, 2016 is expressly incorporated by reference herein

What is claimed is:

1. A projection optical system comprising:
a first lens unit adapted to make an enlargement-side imaging surface located on an enlargement side and an intermediate image conjugate with each other;
a second lens unit adapted to make the intermediate image and a reduction-side imaging surface located on a reduction side conjugate with each other; and
a first light path folding element and a second light path folding element adapted to fold a light path,
wherein the first light path folding element is disposed between the first lens unit and the second lens unit,
wherein the second light path folding element is disposed inside the second lens unit,
wherein the first lens unit has positive power,
wherein the second lens unit has negative power,
wherein defining a focal distance on a d-line of the first lens unit as fU1, a focal distance on a d-line of the second lens unit as fU2, a total lens length of the first lens unit as LLU1, and a total lens length of the second lens unit as LLU2, following conditional expression (1) and conditional expression (2) are satisfied:

$$-0.3 < fU1/fU2 < -0.005 \quad (1)$$

$$0.5 < LLU1/LLU2 < 0.9 \quad (2),$$

wherein the second lens unit is provided with, in the order from the side of the intermediate image toward the side of the reduction-side imaging surface, a second lens unit intermediate image-side first lens, which is provided with a concave surface on the intermediate image side and has positive power, a second lens unit intermediate image-side second lens, which is provided with a concave surface on the reduction-side imaging surface side and is provided with negative power, and a second lens unit intermediate image-side third lens having positive power,
wherein the second lens unit intermediate image-side first lens, the second lens unit intermediate image-side second lens, and the second lens unit intermediate image-side third lens are located between the first light path folding element and the second light path folding element, and
wherein defining a refractive index on a d-line of the second lens unit intermediate image-side first lens as nd (21), and an Abbe number as vd (21), a refractive index on a d-line of the second lens unit intermediate image-side second lens as nd (22), and an Abbe number as vd (22), following conditional expression (3) and conditional expression (4) are satisfied:

$$|nd(22)-nd(21)| < 0.4 \quad (3)$$

$$|vd(21)-vd(22)| < 30 \quad (4).$$

2. The projection optical system according to claim 1, wherein
a principal beam of an off-axis light beam passing between the second lens unit intermediate image-side first lens of the second lens unit and a first lens unit intermediate image-side lens closest to the intermediate image of the first lens unit comes closer to an optical axis as proceeding from the second lens unit intermediate image-side first lens toward the first lens unit intermediate image-side lens.

3. The projection optical system according to claim 2, wherein
a focusing position of the off-axis light in the intermediate image comes closer to the second lens unit intermediate image-side first lens as proceeding toward an off-axis direction.

4. A projection image display device comprising:
the projection optical system according to claim 3; and
an image display element adapted to display an image on the reduction-side imaging surface.

5. A projection image display device comprising:
the projection optical system according to claim 2; and
an image display element adapted to display an image on the reduction-side imaging surface.

6. The projection optical system according to claim 1, wherein
a first lens unit enlargement-side lens located on a most enlargement-side imaging surface side of the first lens unit, and a first lens unit intermediate image-side lens located on a most intermediate image side of the first lens unit are each an aspherical lens.

7. A projection image display device comprising:
the projection optical system according to claim 6; and
an image display element adapted to display an image on the reduction-side imaging surface.

8. The projection optical system according to claim 1, wherein
the first lens unit is provided with, in the order from the side of the enlargement-side imaging surface toward the side of the intermediate image, a first lens unit enlargement-side lens, a first lens group provided with two or more lenses each having negative power, and a second lens group provided with one lens having positive power, and
in a case of changing a projection size on the enlargement-side imaging surface, focusing is performed by moving the first lens group and the second lens group in an optical axis direction in a state of fixing the first lens unit enlargement-side lens.

9. A projection image display device comprising:
the projection optical system according to claim 8; and
an image display element adapted to display an image on the reduction-side imaging surface.

10. The projection optical system according to claim 1, wherein
a second lens unit reduction-side first lens located on a most reduction-side imaging surface side of the second lens unit and a second lens unit reduction-side second lens located adjacent to the second lens unit reduction-side first lens are each provided with positive power, and
the second lens unit reduction-side first lens is higher than 1.75 and lower than 2.00 in refractive index on the d-line, and larger than 20 and smaller than 45 in Abbe number.

11. A projection image display device comprising:
the projection optical system according to claim 10; and
an image display element adapted to display an image on the reduction-side imaging surface.

12. The projection optical system according to claim 1, wherein defining a focal distance on an overall d-line as f, and an air-conversion value of an overall back focus as BF, a following conditional expression (5) is satisfied:

$$6.4 \geq BF/|f| > 5 \qquad (5).$$

13. A projection image display device comprising:
the projection optical system according to claim 12; and
an image display element adapted to display an image on the reduction-side imaging surface.

14. A projection image display device comprising:
the projection optical system according to claim 1; and
an image display element adapted to display an image on the reduction-side imaging surface.

* * * * *